United States Patent
Tsusaka et al.

(10) Patent No.: US 10,688,001 B2
(45) Date of Patent: Jun. 23, 2020

(54) STANDING MOTION ASSIST SYSTEM, METHOD FOR CONTROLLING STANDING MOTION ASSIST SYSTEM, RECORDING MEDIUM, AND ROBOT

(71) Applicant: Panasonic Intellectual Property Management Co., Ltd., Osaka (JP)

(72) Inventors: Yuko Tsusaka, Osaka (JP); Yudai Fudaba, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 446 days.

(21) Appl. No.: 15/413,491

(22) Filed: Jan. 24, 2017

(65) Prior Publication Data

US 2017/0128299 A1 May 11, 2017

Related U.S. Application Data

(63) Continuation of application No. PCT/JP2015/004113, filed on Aug. 19, 2015.

(30) Foreign Application Priority Data

Sep. 19, 2014 (JP) .................................. 2014-190775
Mar. 30, 2015 (JP) .................................. 2015-069798

(51) Int. Cl.
*A61G 7/10* (2006.01)
*A61H 3/04* (2006.01)
(Continued)

(52) U.S. Cl.
CPC ............. *A61G 7/1017* (2013.01); *A61G 5/14* (2013.01); *A61H 3/04* (2013.01); *B25J 9/162* (2013.01);
(Continued)

(58) Field of Classification Search
CPC ...... A61G 7/1017; A61G 5/14; A61G 7/1025; A61H 2003/043; A61H 3/04;
(Continued)

(56) References Cited

U.S. PATENT DOCUMENTS 7,506,388 B1 * 3/2009 Brown ................. A61G 7/1017 5/86.1
2011/0029133 A1 2/2011 Okazaki et al.
(Continued)

FOREIGN PATENT DOCUMENTS

JP        09000570 A  *  1/1997  ........... A61G 7/1096
JP     2004-089227        3/2004
(Continued)

OTHER PUBLICATIONS

JP 09000570 Translation (Year: 1997).*
International Search Report of PCT application No. PCT/JP2015/004113 dated Oct. 6, 2015.

*Primary Examiner* — Nicholas F Polito
*Assistant Examiner* — Amanda L Bailey
(74) *Attorney, Agent, or Firm* — Wenderoth, Lind & Ponack, L.L.P.

(57) ABSTRACT

A standing motion assist system includes a care belt including a holding mechanism including a holder that holds a back and both armpits of a care-receiver, and a connector that is connected to the holding mechanism; a rotational force applying mechanism that is connected to the holding mechanism and that rotates a front lower part of the holder upward and a rear upper part of the holder downward about a rotation axis extending through both armpits; a traction mechanism that is connected to the connector and pulls the connector; and a controller that controls the rotational force applying mechanism and the traction mechanism so that, after the traction mechanism has started the pulling motion, the rotational force applying mechanism rotates the holder at (Continued)

the same time as the traction mechanism pulls the connector forward and upward, and subsequently the traction mechanism pulls the connector upward.

7 Claims, 37 Drawing Sheets

(51) Int. Cl.
| | | |
|---|---|---|
| *B25J 13/00* | (2006.01) | |
| *B25J 11/00* | (2006.01) | |
| *A61G 5/14* | (2006.01) | |
| *B25J 9/16* | (2006.01) | |

(52) U.S. Cl.
CPC ............ *B25J 9/1633* (2013.01); *B25J 11/00* (2013.01); *B25J 11/009* (2013.01); *B25J 13/00* (2013.01); *A61H 2003/043* (2013.01); *A61H 2003/046* (2013.01); *G05B 2219/40411* (2013.01); *Y10S 901/01* (2013.01); *Y10S 901/02* (2013.01)

(58) Field of Classification Search
CPC ..... A61H 2003/046; B25J 9/162; B25J 11/00; B25J 11/009; G05B 2219/40411; Y10S 901/09; Y10S 901/01; Y10S 901/02; B65J 9/162; B65J 9/1633
See application file for complete search history.

(56) References Cited

U.S. PATENT DOCUMENTS

| | | | |
|---|---|---|---|
| 2011/0270443 A1 | 11/2011 | Kamiya et al. | |
| 2015/0005938 A1* | 1/2015 | Suzuki | A61G 7/1017 700/253 |
| 2015/0231005 A1* | 8/2015 | Gray | A61G 5/14 5/86.1 |

FOREIGN PATENT DOCUMENTS

| | | |
|---|---|---|
| JP | 2008-067849 | 3/2008 |
| JP | 2011-019571 | 2/2011 |
| JP | 2013-078601 | 5/2013 |
| JP | 2013-158386 | 8/2013 |

\* cited by examiner

FIG. 5A

| TIME (msec) | POSITION (m) AND ORIENTATION (rad) |
|---|---|
| t0 | p0 |
| t1 | p1 |
| .. | .. |
| t10 | p10 |
| t11 | p11 |
| . . . . | . . . . |

FIG. 5B

| TIME | POSITION, ANGLE |
|---|---|
| t0 | p0(X0,Z0), $\theta 0$ |
| t1 | p1(X1,Z1), $\theta 1$ |
| .. | .. |
| t28 | p28(X28,Z28), $\theta 28$ |
| t29 | p29(X29,Z29), $\theta 29$ |
| t30 | p30(X30,Z30), $\theta 30$ |
| t31 | p31(X31,Z31), $\theta 31$ |
| t32 | p32(X32,Z32), $\theta 32$ |
| .. | .. |
| t50 | p50(X50,Z50), $\theta 50$ |
| t51 | p51(X51,Z51), $\theta 51$ |
| .. | .. |

FIG. 6B
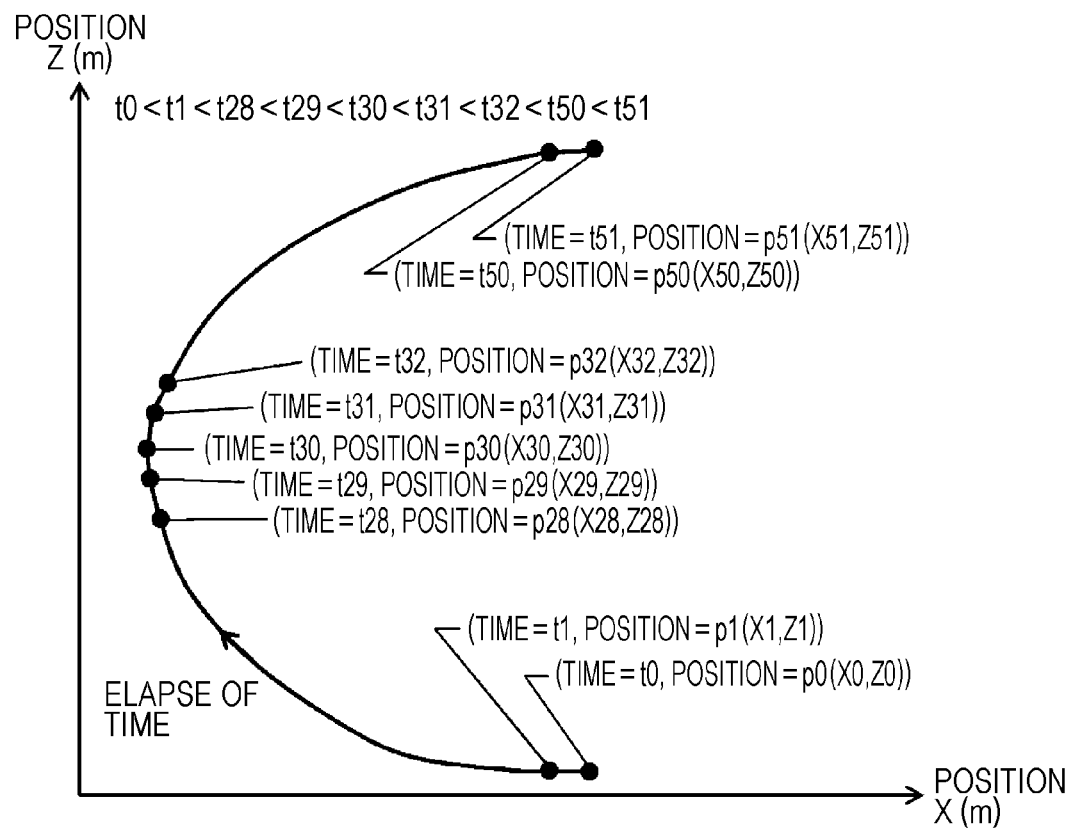
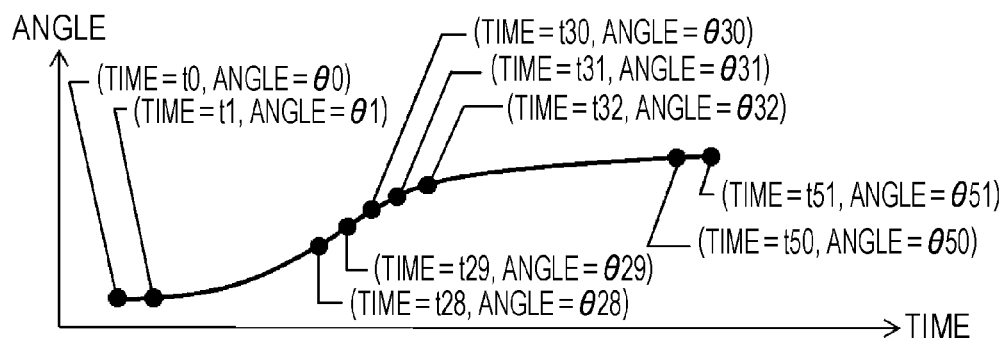

FIG. 11

| TIME (msec) | POSITION (m) AND ORIENTATION (rad) | FORCE (N) |
|---|---|---|
| t0 | p0 | f0 |
| t1 | p1 | f1 |
| .. | .. | .. |
| t10 | p10 | f10 |
| t11 | p11 | f11 |
| ⋮ | ⋮ | ⋮ |

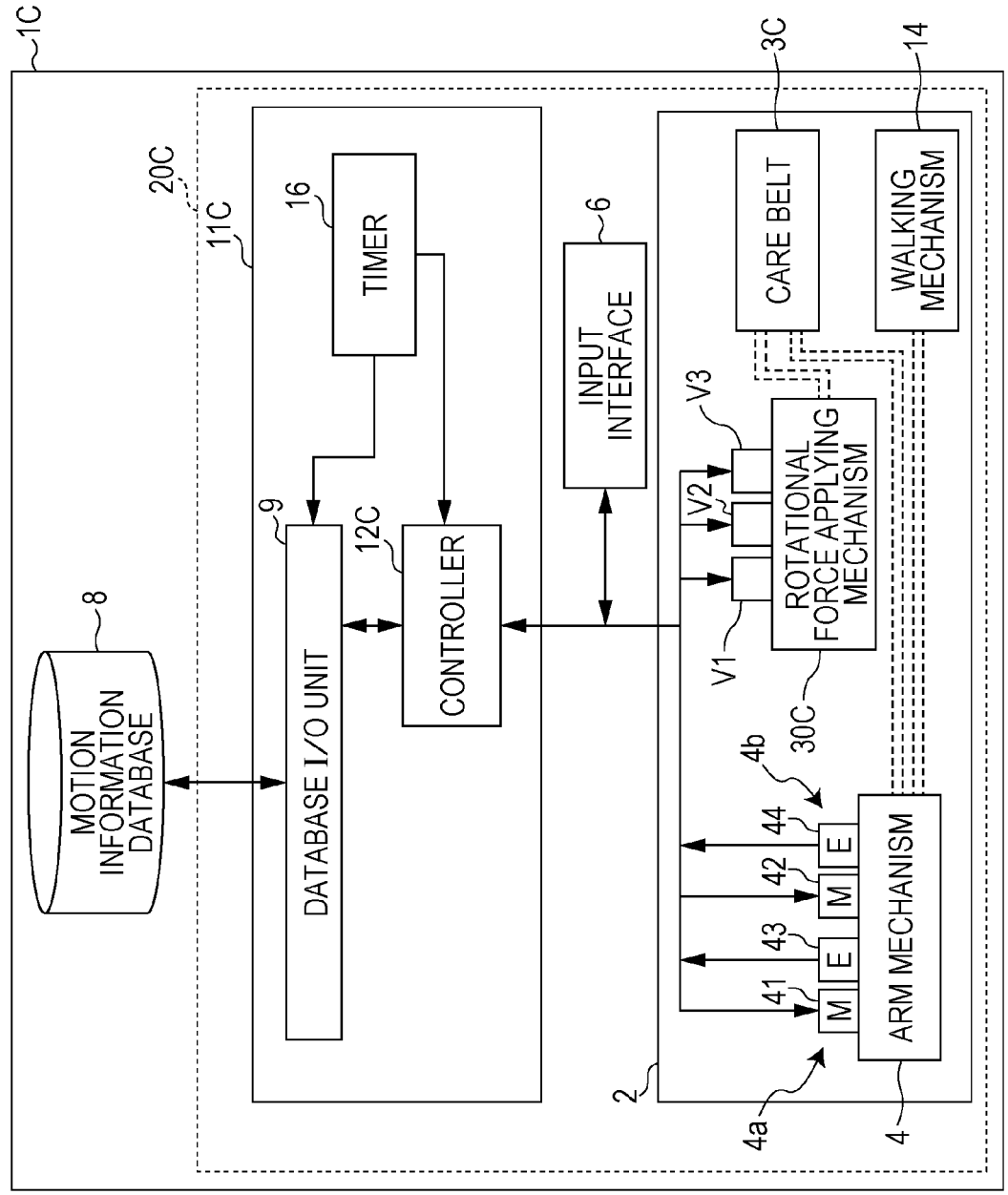

FIG. 18

| TIME (msec) | POSITION (m) | AIR PRESSURE (kpa) |
|---|---|---|
| t0 | p0 | f0 |
| t1 | p1 | f1 |
| .. | .. | .. |
| t10 | p10 | f10 |
| t11 | p11 | f11 |
| ⋮ | ⋮ | ⋮ |

STANDING MOTION ASSIST SYSTEM, METHOD FOR CONTROLLING STANDING MOTION ASSIST SYSTEM, RECORDING MEDIUM, AND ROBOT

BACKGROUND

1. Technical Field

The present disclosure relates to a standing motion assist system for assisting a care-receiver in standing up from a sitting position, a method for controlling a standing motion assist system, a recording medium, and a robot.

2. Description of the Related Art

An existing standing motion assist robot includes a support portion that moves along a path, which has been set in accordance with a care-receiver, in such a way that the support portion may not go beyond the start point and the end point of the path. The standing motion assist robot was developed because it is important for the support portion not to go beyond the start point of the path (corresponding to, for example, a sitting position of the care-receiver) or the end point of the path (corresponding to, for example, a standing position of the care-receiver) in order to ensure the safety of the care-receiver (see Japanese Unexamined Patent Application Publication No. 2013-158386).

However, the existing technology described above has room for improvement in care-receiver assistance.

SUMMARY

One non-limiting and exemplary embodiment of the present disclosure makes it possible to reduce the degree of forward leaning of a care-receiver in the initial stage of a standing motion and to assist the care-receiver in performing a standing motion similar to that of an able-bodied adult person.

In one general aspect, the techniques disclosed here feature a standing motion assist system for assisting a care-receiver in performing a standing motion. The standing motion assist system includes a care belt including a holding mechanism including a holder that holds a back and both armpits of the care-receiver, and a connector that is located at a chest of the care-receiver and that is connected to the holding mechanism at a position in front of the care-receiver; a rotational force applying mechanism that is connected to the holding mechanism and that rotates a front lower part of the holder upward and a rear upper part of the holder downward about a rotation axis extending through both armpits of the care-receiver; a traction mechanism that is connected to the connector and that pulls the connector; and a controller that controls a rotational motion of the rotational force applying mechanism and a pulling motion of the traction mechanism so that, after the traction mechanism has started the pulling motion, the rotational force applying mechanism rotates the front lower part of the holder upward and the rear upper part of the holder downward at the same time as the traction mechanism pulls the connector forward and upward from the care-receiver, and subsequently the traction mechanism pulls the connector upward.

It should be noted that general or specific embodiments may be implemented as an apparatus, a system, a method, an integrated circuit, a computer program, a computer-readable storage medium, or any selective combination thereof. Examples of the computer-readable recording medium include a non-transitory computer-readable recording medium, such as a compact disc read-only memory (CD-ROM).

With the present disclosure, it is possible to improve assistance for care-receivers. To be specific, it is possible to reduce the degree of forward leaning of a care-receiver in the initial stage of a standing motion (that is, when the care-receiver lifts their buttocks off a seat from a sitting position) and to assist the care-receiver in performing a standing motion similar to that of an able-bodied adult person.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 5A illustrates the structure of a motion information database according to the first embodiment of the present disclosure;

FIG. 5B illustrates the structure of a motion information database according to a modification of the first embodiment of the present disclosure;

FIG. 6B shows graphs illustrating target coordinates and target rotation angles according to a modification of the present disclosure;

FIG. 11 illustrates the structure of a motion information database according to the second embodiment of the present disclosure;

FIG. 16 is a block diagram of the robot system according to the third embodiment of the present disclosure;

FIG. 18 illustrates the structure of a motion information database according to the third embodiment of the present disclosure;

DETAILED DESCRIPTION

Figure 1A:
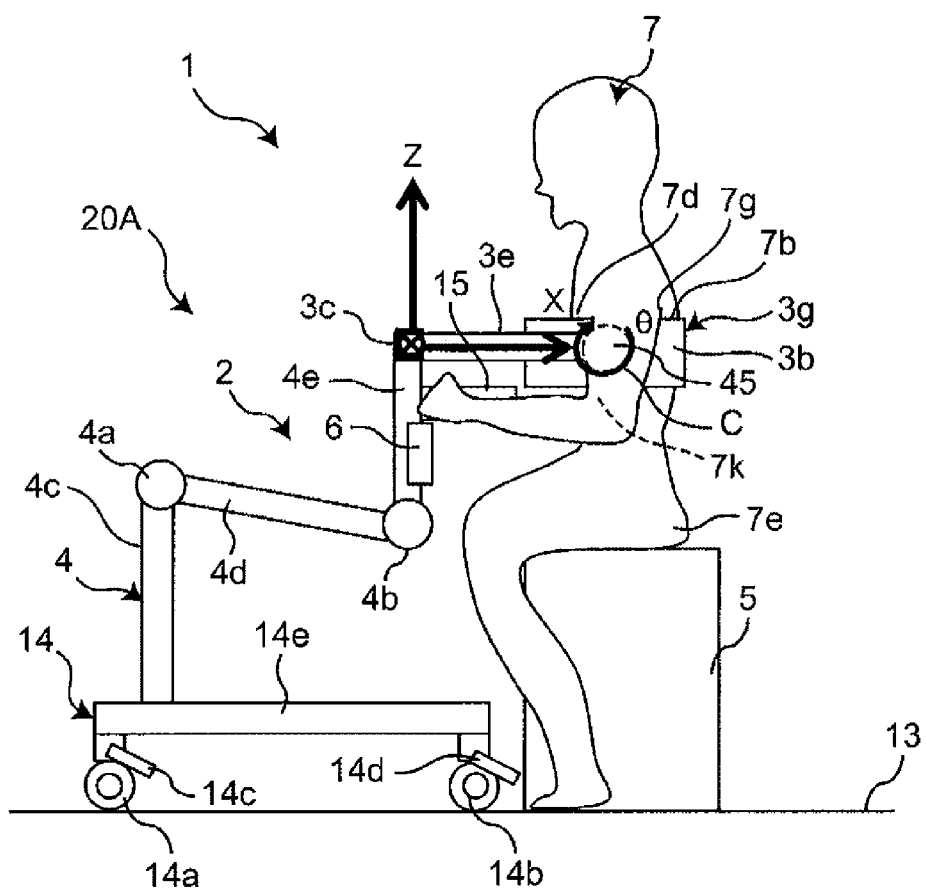
FIG. 1A is a schematic side view illustrating a care-receiver and a robot system according to a first embodiment of the present disclosure, which is an example of a standing motion assist system (that is, a standing motion assist apparatus)

Hereinafter, embodiments of the present disclosure will be described with reference to the drawings.

Before describing the embodiments of the present disclosure with reference to the drawings, various aspects of the present disclosure will be described.

A first aspect of the present disclosure provides a standing motion assist system for assisting a care-receiver in performing a standing motion. The standing motion assist system includes a care belt including a holding mechanism including a holder that holds a back and both armpits of the care-receiver, and a connector that is located at a chest of the care-receiver and that is connected to the holding mechanism at a position in front of the care-receiver; a rotational force applying mechanism that is connected to the holding mechanism and that rotates a front lower part of the holder upward and a rear upper part of the holder downward about a rotation axis extending through both armpits of the care-receiver; a traction mechanism that is connected to the connector and that pulls the connector; and a controller that controls a rotational motion of the rotational force applying mechanism and a pulling motion of the traction mechanism so that, after the traction mechanism has started the pulling motion, the rotational force applying mechanism rotates the front lower part of the holder upward and the rear upper part of the holder downward at the same time as the traction mechanism pulls the connector forward and upward from the care-receiver, and subsequently the traction mechanism pulls the connector upward.

With the first aspect, the standing motion assist system causes the upper body of the care-receiver to lean backward by rotating the front lower part of the holder forward and upward and a rear upper part of the holder backward and downward. Therefore, in the initial stage of a standing motion (that is, when a care-receiver, who in a sitting position, lifts their buttocks off a seat), the standing motion assist system can reduce the degree of forward leaning of the care-receiver and can assist the care-receiver in performing a standing motion that is similar to that of an able-bodied adult person.

A second aspect of the present disclosure provides the standing motion assist system according to the first aspect, in which the controller controls the traction mechanism so that the traction mechanism increases a pulling velocity while the traction mechanism is pulling the connector forward and upward from the care-receiver.

With the second aspect, in the initial stage of a standing motion, the standing motion assist system can reduce the degree of forward leaning of the care-receiver and can assist the care-receiver in lifting their buttocks off a seat and standing up more easily.

A third aspect of the present disclosure provides a standing motion assist system for assisting a care-receiver in performing a standing motion. The standing motion assist system includes a care belt including a holding mechanism including a holder that holds a back and both armpits of the care-receiver, and a connector that is located at a chest of the care-receiver and that is connected to the holding mechanism at a position in front of the care-receiver; a rotational force applying mechanism that is connected to the holding mechanism and that includes a first inflatable chamber and a second inflatable chamber that are located at the back of the care-receiver, the first inflatable chamber being located below the second inflatable chamber in a vertical direction, the first inflatable chamber and the second inflatable chamber independently inflating when a gas is independently supplied thereto; a traction mechanism that is connected to the connector and that pulls the connector; and a controller that controls a gas supplying operation of the rotational force applying mechanism and a pulling motion of the traction mechanism. The controller controls the rotational force applying mechanism and the traction mechanism so that, while the traction mechanism is pulling the connector forward and upward, the rotational force applying mechanism supplies the gas to the first inflatable chamber and subsequently supplies the gas to the second inflatable chamber.

With the third aspect, the standing motion assist system causes the back of the care-receiver to lean backward by applying the pressure of the gas to the back part of the holder. Therefore, in the initial stage of a standing motion, the standing motion assist system can reduce the degree of forward leaning of the care-receiver and can assist the care-receiver in performing a standing motion that is similar to that of an able-bodied adult person.

A fourth aspect of the present disclosure provides the standing motion assist system according to the third aspect, in which the controller controls the traction mechanism so that the traction mechanism increases a pulling velocity while the traction mechanism is pulling the connector forward and upward from the care-receiver.

With the fourth aspect, in the initial stage of a standing motion, the standing motion assist system can reduce the degree of forward leaning of the care-receiver and can assist the care-receiver in lifting their buttocks off the seat and standing up easily.

A fifth aspect of the present disclosure provides the standing motion assist system according to any one of the first to fourth aspects, in which the traction mechanism includes an arm mechanism including a plurality of joints; and the standing motion assist system further includes a walking mechanism that includes a pair of front and rear wheels and on which the arm mechanism is disposed.

With the fifth aspect, the care-receiver can start walking immediately after the care-receiver has stood up from a sitting position by being assisted by the arm mechanism.

A sixth aspect of the present disclosure provides the standing motion assist system according to any one of the second to fifth aspects, in which the traction mechanism includes an arm mechanism including a plurality of joints; in which the standing motion assist system further includes a force acquirer that acquires force information about an external force applied to the arm mechanism, a position acquirer that acquires position information about a position of the arm mechanism, and a motion information generator that generates motion information about a motion of the arm mechanism from the force information acquired by the force acquirer and the position information acquired by the position acquirer; and in which the controller controls the motion of the arm mechanism on the basis of the motion information generated by the motion information generator.

With the sixth aspect, irrespective of the difference in the height of the care-receiver or the difference in the muscular strength of the upper body or the lower body of the care-receiver, in the initial stage of a standing motion, the standing motion assist system can reduce the degree of forward leaning of the care-receiver and can assist the care-receiver in performing a standing motion similar to that of an able-bodied adult person.

A seventh aspect of the present disclosure provides the standing motion assist system according to the sixth aspect, in which, when the controller is controlling the traction mechanism so that the traction mechanism pulls the connector forward and upward, the motion information generator calculates a difference between a first force at a first time and a second force at a second time, the first time being earlier than the second time, the first and second forces being acquired by the force acquirer; in which, from a time when the traction mechanism starts pulling the connector to a time when a sign of the difference between the first force and the second force acquired by the force acquirer changes, the motion information generator generates motion information such that the arm mechanism pulls the connector forward and upward; and in which, after the sign of the difference between the first force and the second force has changed, the motion information generator generates motion information such that the arm mechanism pulls the connector upward.

With the seventh aspect, the standing motion assist system can automatically generate the motion information even if there is a difference in the timing at which the buttocks of the care-receiver leave the seat due to the difference in the height of the care-receiver or the difference in the muscular strength of the upper body or the lower body of the care-receiver.

An eighth aspect of the present disclosure provides a method for controlling a standing motion assist system. The standing motion assist system includes a care belt including a holding mechanism including a holder that holds a back and both armpits of the care-receiver, and a connector that is located at a chest of the care-receiver and that is connected to the holding mechanism at a position in front of the care-receiver; a rotational force applying mechanism that is connected to the holding mechanism and that rotates a front lower part of the holder upward and a rear upper part of the holder downward about a rotation axis extending through both armpits of the care-receiver; a traction mechanism that is connected to the connector and that pulls the connector; and a controller that controls a rotational motion of the rotational force applying mechanism and a pulling motion of the traction mechanism. The method includes causing the controller to control the traction mechanism so that, after the traction mechanism has started the pulling motion, the traction mechanism pulls the connector forward and upward from the care-receiver; causing the controller to control the rotational force applying mechanism so that the rotational force applying mechanism rotates the holder at the same time as the traction mechanism pulls the connector forward and upward from the care-receiver; and subsequently, causing the controller to control the rotational force applying mechanism so that the rotational force applying mechanism rotates the holder while the traction mechanism pulls the connector upward.

With the eighth aspect, the upper body of the care-receiver is caused to lean backward by rotating the front lower part of the holder forward and upward and a rear upper part of the holder backward and downward. Therefore, in the initial stage of a standing motion, the degree of forward leaning of the care-receiver can be reduced, and the care-receiver can be assisted in performing a standing motion that is similar to that of an able-bodied adult person.

A ninth aspect of the present disclosure provides a non-transitory computer-readable recording medium storing a control program for causing an apparatus including a processor to execute a process. The apparatus includes a care belt including a holding mechanism including a holder that holds a back and both armpits of the care-receiver, and a connector that is located at a chest of the care-receiver and that is connected to the holding mechanism at a position in front of the care-receiver; a rotational force applying mechanism that is connected to the holding mechanism and that rotates a front lower part of the holder upward and a rear upper part of the holder downward about a rotation axis extending through both armpits of the care-receiver; a traction mechanism that is connected to the connector and that pulls the connector; and a controller that controls a rotational motion of the rotational force applying mechanism and a pulling motion of the traction mechanism. The process includes causing the controller to control the traction mechanism so that, after the traction mechanism has started the pulling motion, the traction mechanism pulls the connector forward and upward from the care-receiver; causing the controller to control the rotational force applying mechanism so that the rotational force applying mechanism rotates the holder at the same time as the traction mechanism pulls the connector forward and upward from the care-receiver; and subsequently, causing the controller to control the rotational force applying mechanism so that the rotational force applying mechanism rotates the holder while the traction mechanism pulls the connector upward.

With the ninth aspect, the upper body of the care-receiver is caused to lean backward by rotating the front lower part of the holder forward and upward and a rear upper part of the holder backward and downward. Therefore, in the initial state of a standing motion, the degree of forward leaning of the care-receiver can be reduced, and the care-receiver can be assisted in performing a standing motion that is similar to that of an able-bodied adult person.

A tenth aspect of the present disclosure provides a method for controlling a standing motion assist system. The standing motion assist system includes a care belt including a holding mechanism including a holder that holds a back and both armpits of the care-receiver, and a connector that is located at a chest of the care-receiver and that is connected to the holding mechanism at a position in front of the care-receiver; a rotational force applying mechanism that is connected to the holding mechanism and that includes a first inflatable chamber and a second inflatable chamber that are located at the back of the care-receiver, the first inflatable chamber being located below the second inflatable chamber in a vertical direction, the first inflatable chamber and the second inflatable chamber independently inflating when a gas is independently supplied thereto; a traction mechanism that is connected to the connector and that pulls the connector; and a controller that controls a gas supplying operation of the rotational force applying mechanism and a pulling motion of the traction mechanism. The method includes causing the controller to control the traction mechanism so that the traction mechanism pulls the connector forward and upward from the care-receiver; causing the controller to control the rotational force applying mechanism so that the rotational force applying mechanism supplies the gas to the first inflatable chamber while the traction mechanism is pulling the connector forward and upward from the care-receiver; causing the controller to control the rotational force applying mechanism so that the rotational force applying mechanism supplies the gas to the second inflatable chamber after having supplied the gas to the first inflatable chamber; and subsequently, causing the controller to control the traction mechanism so that the traction mechanism pulls the connector upward.

With the tenth aspect, the back of the care-receiver is caused to lean backward by applying the pressure of the gas to the back part of the holder. Therefore, the degree of forward leaning of the care-receiver in the initial stage of a standing motion can be reduced, and the care-receiver can be assisted in performing a standing motion that is similar to that of an able-bodied adult person.

An eleventh aspect of the present disclosure provides a non-transitory computer-readable recording medium storing a control program for causing an apparatus including a processor to execute a process. The apparatus includes a care belt including a holding mechanism including a holder that holds a back and both armpits of the care-receiver, and a connector that is located at a chest of the care-receiver and that is connected to the holding mechanism at a position in front of the care-receiver; a rotational force applying mechanism that is connected to the holding mechanism and that includes a first inflatable chamber and a second inflatable chamber that are located at the back of the care-receiver, the first inflatable chamber being located below the second inflatable chamber in a vertical direction, the first inflatable chamber and the second inflatable chamber independently inflating when a gas is independently supplied thereto; a traction mechanism that is connected to the connector and that pulls the connector; and a controller that controls a gas supplying operation of the rotational force applying mechanism and a pulling motion of the traction mechanism. The process includes causing the controller to control the traction mechanism so that the traction mechanism pulls the connector forward and upward from the care-receiver; causing the controller to control the rotational force applying mechanism so that the rotational force applying mechanism supplies the gas to the first inflatable chamber while the traction mechanism is pulling the connector forward and upward from the care-receiver; causing the controller to control the rotational force applying mechanism so that the rotational force applying mechanism supplies the gas to the second inflatable chamber after having supplied the gas to the first inflatable chamber; and subsequently, causing the controller to control the traction mechanism so that the traction mechanism pulls the connector upward.

With the eleventh aspect, the back of the care-receiver is caused to lean backward by applying the pressure of the gas to the back part of the holder. Therefore, the degree of forward leaning of the care-receiver in the initial stage of a standing motion can be reduced, and the care-receiver can be assisted in performing a standing motion that is similar to that of an able-bodied adult person.

A twelfth aspect of the present disclosure provides a robot including an arm mechanism that is connected to a connector included in a supporter including a holder for holding a user and that moves the connector in a direction of an x-axis and/or in a direction of a z-axis; a rotational force applying mechanism that rotates the holder about a rotation axis; and a controller that controls the arm mechanism and the rotational force applying mechanism on the basis of data contained in a motion information database, the data including a time, target coordinates at the time, and a target rotation angle at the time. In the robot, the time, the target coordinates, and the target rotation angle correspond one-to-one to each other; the target coordinates represent a target position related to the arm mechanism at a corresponding time, and the target rotation angle represents a target angle related to the rotational force applying mechanism at a corresponding time; the x-axis and the z-axis are parallel to an imaginary plane in which an arm included in the arm mechanism moves, the x-axis and the z-axis are perpendicular to each other, and the z-axis is perpendicular to a surface on which the robot is placed; a direction from the surface, on which the robot is placed, toward the robot is a positive direction along the z-axis; a direction from the connector toward a user, to whom the supporter is attached, is a positive direction along the x-axis; the rotation axis is fixed relative to a position of the supporter; the rotation axis is perpendicular to the imaginary plane; a clockwise rotation of the rotation axis is a positive rotation when the user, to whom the supporter is attached, is seen from a left side of the user; when the time is in a period from t1 to t3, a z-coordinate of the target coordinates increases and the target rotation angle increases; when the time is in a period from t1 to t2, an x-coordinate of the target coordinates decreases; and when the time is in a period from t2 to t3, the x-coordinate of the target coordinates increases, where t1<t2<t3.

A thirteenth aspect of the present disclosure provides the robot according to the twelfth aspect, in which the supporter includes a back holder for supporting a back of the user, to whom the supporter is attached; a chest holder for supporting a chest of the user, to whom the supporter is attached; a left-chest-side holder for supporting a left side of the chest of the user, to whom the supporter is attached; a right-chest-side holder for supporting a right side of the chest of the user, to whom the supporter is attached; and an arm support portion that is connected to the connector and is connected to the holder support member via the rotational force applying mechanism, the holder support member supporting the back holder, the chest holder, the left-chest-side holder, and the right-chest-side holder.

Underlying Knowledge Forming Basis of the Present Disclosure

Figure 22A:
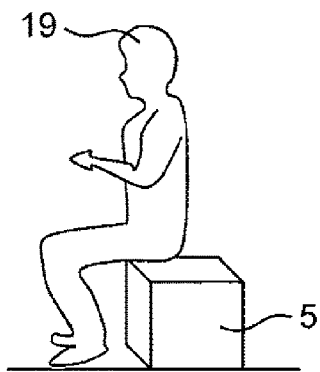
FIG. 22A illustrates a standing motion of an able-bodied adult person.
Figure 22B:
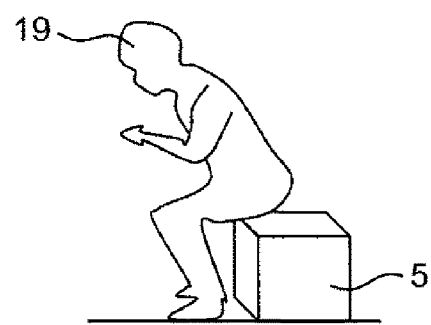
FIG. 22B illustrates a standing motion of the able-bodied adult person.
Figure 22C:
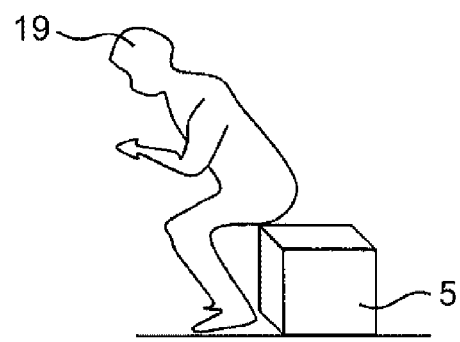
FIG. 22C illustrates a standing motion of the able-bodied adult person.
Figure 22D:
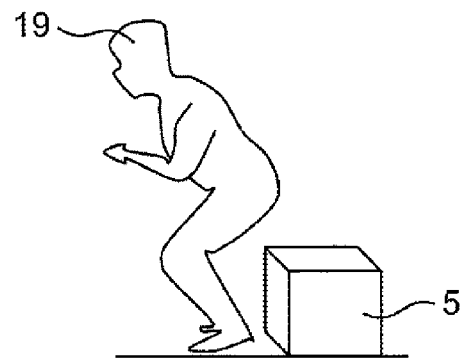
FIG. 22D illustrates a standing motion of the able-bodied adult person.
Figure 22E:
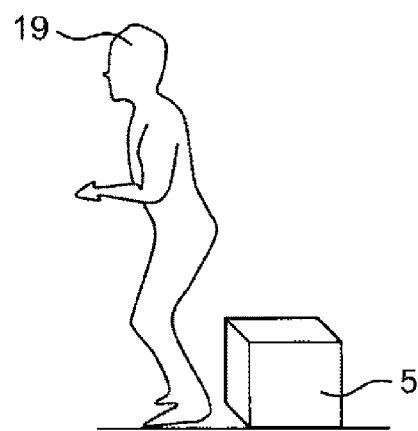
FIG. 22E illustrates a standing motion of the able-bodied adult person.
Figure 22F:
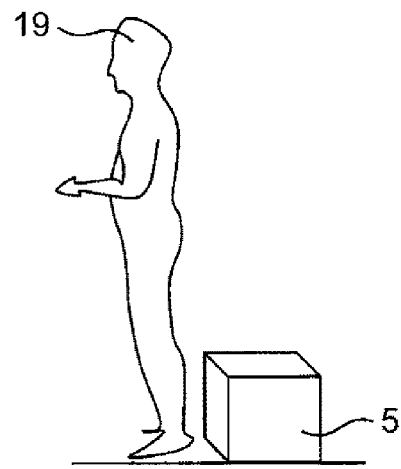
FIG. 22F illustrates a standing motion of the able-bodied adult person.

FIGS. 22A to 22F illustrate a standing motion of an able-bodied adult person 19 from a sitting position on a seat 5 to a standing position. As illustrated in FIGS. 22A and 22B, the able-bodied adult person 19, who is in a sitting position, moves their body center of mass forward. Next, as illustrated in FIG. 22C, the able-bodied adult person 19 lifts their buttocks off the seat 5. After the buttocks have left the seat 5, as illustrated in FIGS. 22D to 22F, the able-bodied adult person 19 starts a standing motion by straightening the knee while moving their body center of mass backward.

Figure 21A:
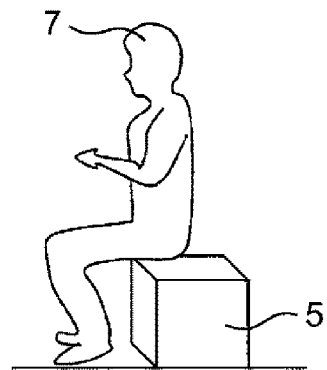
FIG. 21A illustrates a standing motion of an elderly person.
Figure 21B:
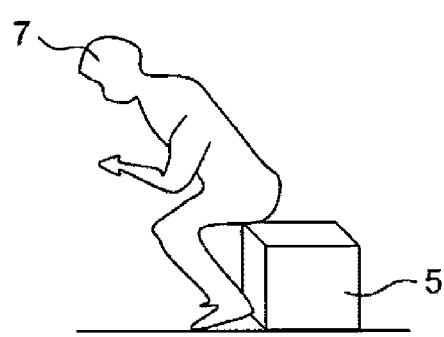
FIG. 21B illustrates a standing motion of the elderly person.
Figure 21C:
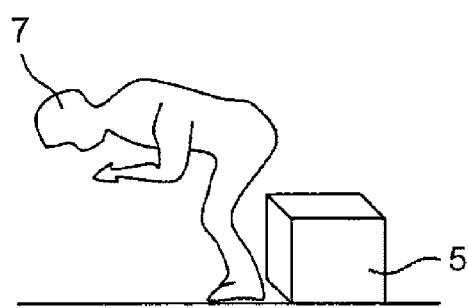
FIG. 21C illustrates a standing motion of the elderly person.

On the other hand, most care-receivers can move only slowly due to decline in muscular strength. Therefore, as illustrated in FIGS. 21B and 21C, in the initial stage of the standing motion (that is, when a care-receiver 7 lifts their buttocks off the seat from a sitting position), it is necessary for the care-receiver 7 to lean forward to a large degree to move their body center of mass forward.

Therefore, when the robot described in Japanese Unexamined Patent Application Publication No. 2013-158386 is in a manual mode, in a case where the velocity of the support portion is set at a low velocity in accordance with the motion of the care-receiver 7, it is difficult for the buttocks to leave the seat if the path of the support portion is such that it causes the care-receiver 7 to lean forward only slightly. On the other hand, if the path is such that it causes the care-receiver to lean forward to a large degree, the care-receiver 7 can lift their buttocks off the seat. In this case, however, a heavy load is applied to the lower limbs of the care-receiver 7, because the care-receiver 7 has to move a longer distance to assume a standing position, and particularly because the care-receiver 7 has to remain in a half-sitting position for a long time. Moreover, when the care-receiver 7 leans forward to a large degree, their line of site is usually directed toward the ground. Therefore, the care-receiver 7 tends to feel dizzy or lose balance as the direction of their line of sight shifts to the forward direction.

The present inventors have realized that it is desirable to reduce the degree of forward leaning of a care-receiver so that the care-receiver can be assisted in performing a standing motion close to that of an able-bodied adult person in the initial stage of the standing motion (that is, when the care-receiver lifts their buttocks off a seat from a sitting position). The present inventors have also realized that the standing motion assist robot described in Japanese Unexamined Patent Application Publication No. 2013-158386 has a problem in that the robot is large and heavy because the movable range of the robot is large and the robot needs to support most of the weight of a care-receiver.

The present inventors have found that it is possible to reduce the degree of forward leaning of the care-receiver in the initial stage of a standing motion and to assist the care-receiver in performing a standing motion closer to that of an able-bodied adult as follows: a holding mechanism, which can hold a part of a care-receiver including the back, both armpits, and the pit-of-the-stomach, is used; and while a traction mechanism pulls the holding mechanism forward and upward, the holding mechanism is rotated so that the back of the care-receiver leans backward. The present inventors have also found that the size and weight of the apparatus can be reduced with such a structure.

Hereinafter, standing motion assist systems and the like according to embodiments of the present disclosure will be described in detail.

First Embodiment

Figure 1B:
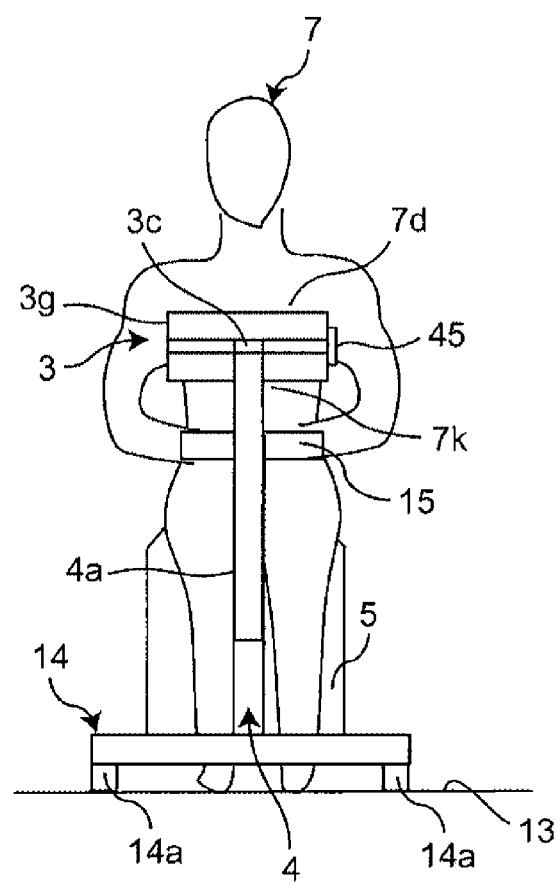
FIG. 1B is a schematic front view illustrating the care-receiver and the robot system according to the first embodiment of the present disclosure when the care-receiver is in a sitting position.
Figure 2:
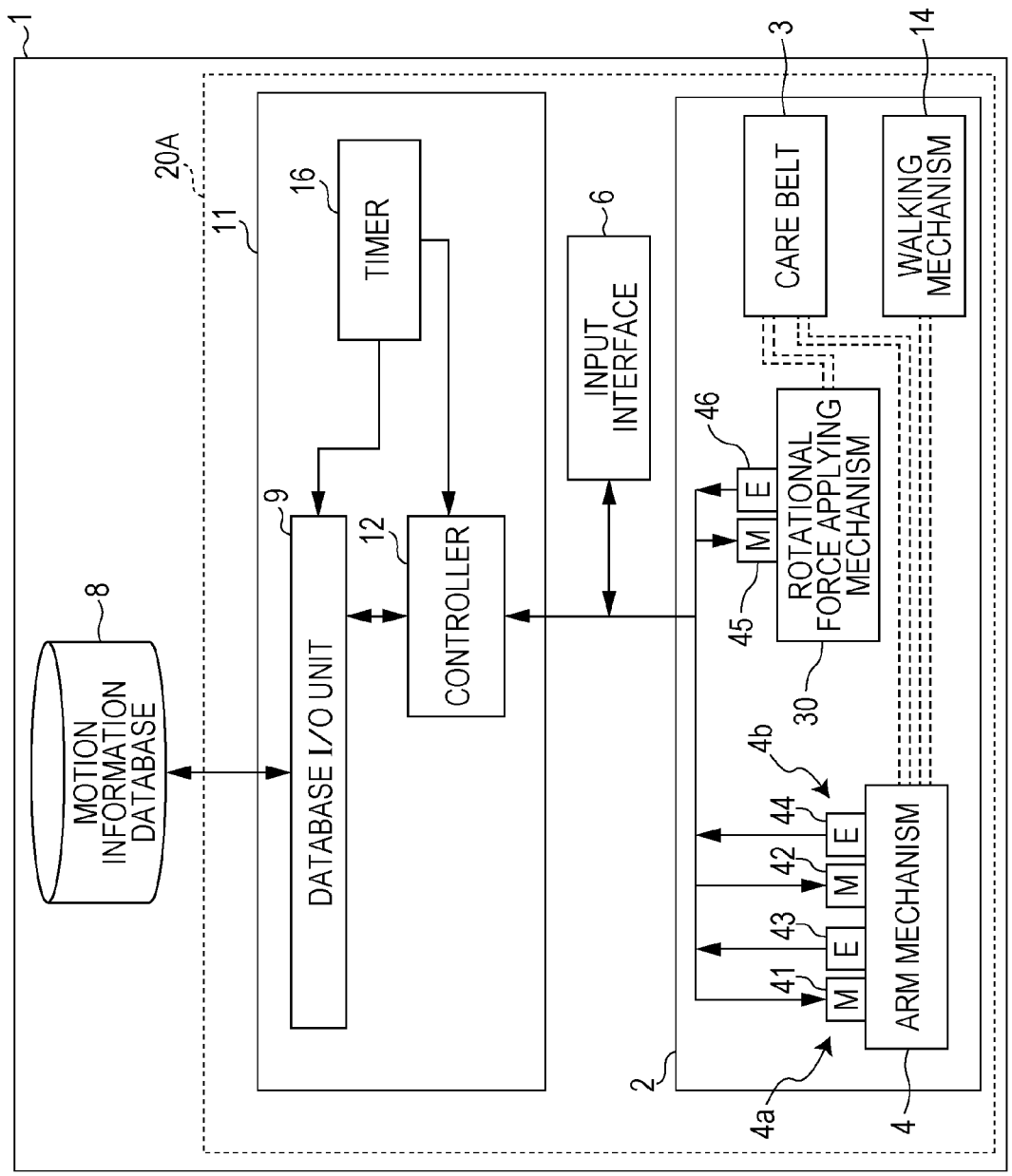
FIG. 2 is a block diagram of the robot system according to the first embodiment of the present disclosure.
Figure 3A:
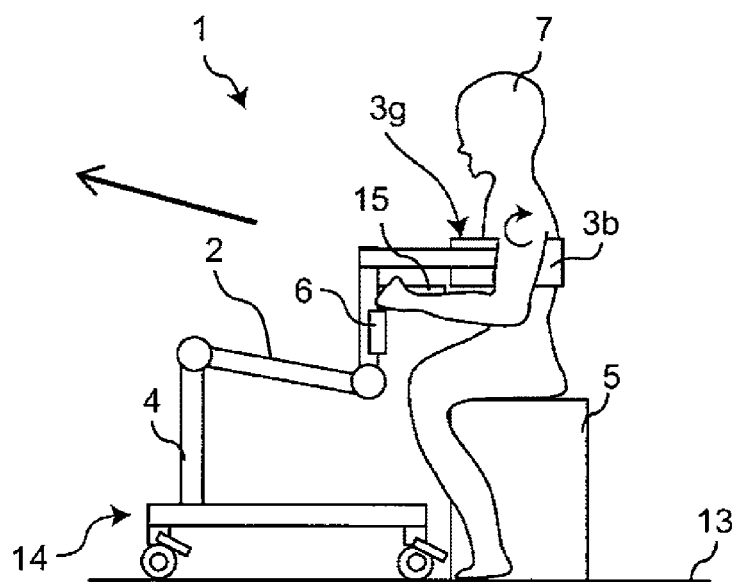
FIG. 3A is a schematic view illustrating a motion of the robot system according to the first embodiment of the present disclosure.
Figure 3B:
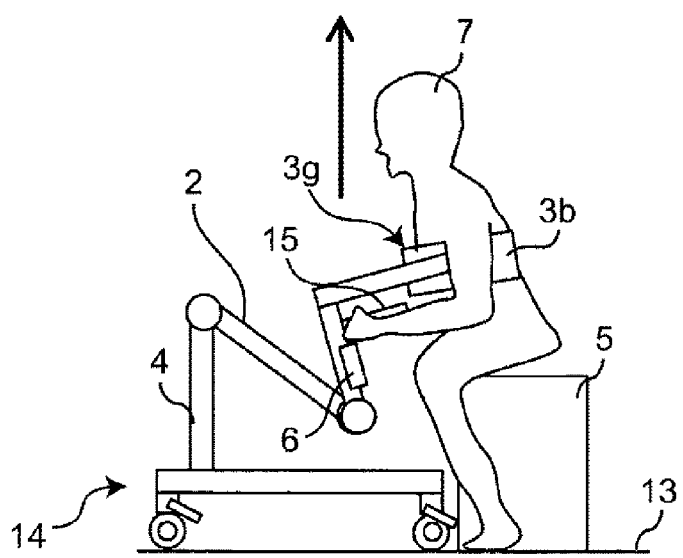
FIG. 3B is a schematic view illustrating a motion of the robot system according to the first embodiment of the present disclosure.
Figure 3C:
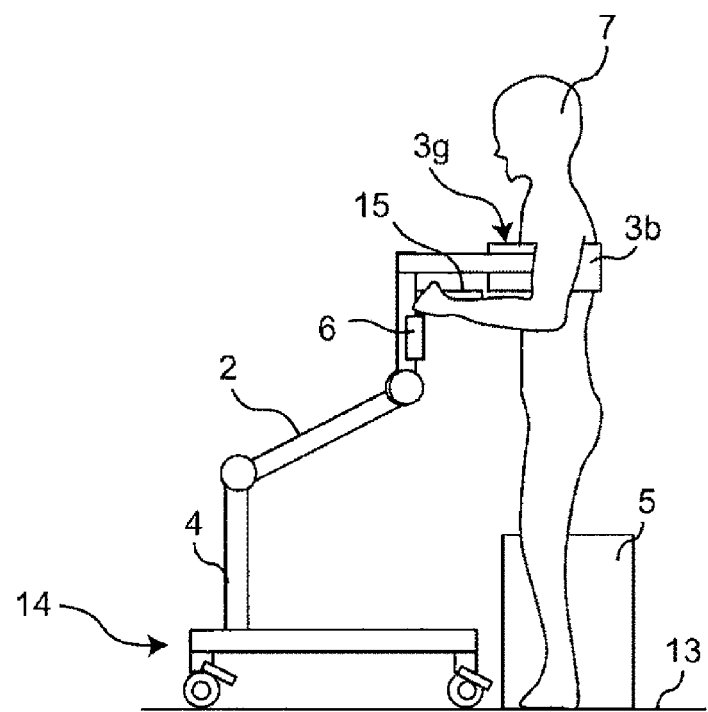
FIG. 3C is a schematic view illustrating a motion of the robot system according to the first embodiment of the present disclosure.
Figure 10:
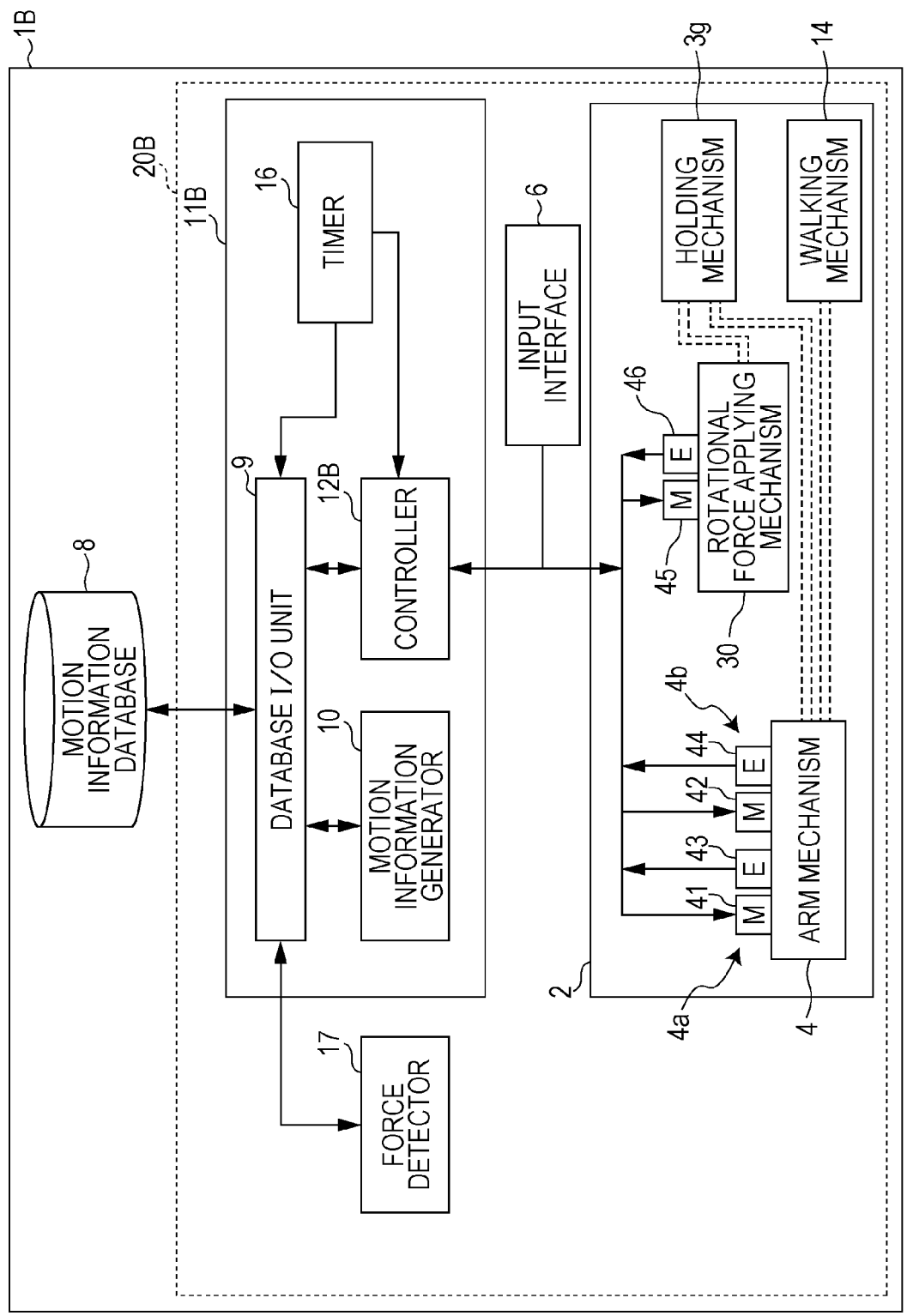
FIG. 10 is a block diagram of the robot system according to the second embodiment of the present disclosure.

FIGS. 1A and 1B are respectively a side view and a front view of a robot system 1 that is an example of a standing motion assist system (that is, a standing motion assist apparatus) according to a first embodiment of the present disclosure, illustrating an exemplary operation of a robot 20A that assists the care-receiver 7 in moving from a sitting position to a standing position. The care-receiver 7 assumes a sitting position by sitting on the seat 5 on a floor 13. FIG. 10 is a front view illustrating the robot system 1 when the care-receiver 7 is in a standing position. FIG. 2 is a block diagram of the robot system 1 according to the first embodiment. FIGS. 3A to 3C are schematic views illustrating motions of the robot system 1 according to the first embodiment of the present disclosure.

As illustrated in FIGS. 1A to 2, the robot system 1, which is an example of a standing motion assist system and which assists the care-receiver 7 in performing a standing motion, includes the robot 20A. As illustrated in FIG. 2, the robot system 1 includes a motion information database 8 that is outside of the robot 20A. However, although not illustrated, the motion information database 8 may be included in the robot 20A.

The robot 20A is placed on the floor 13. The robot 20A includes a body mechanism 2, a control device 11, and an input interface 6.

The body mechanism 2 includes an arm mechanism 4, a rotational force applying mechanism 30, a care belt 3, and a walking mechanism 14. The arm mechanism 4 at least includes a robot arm, which is an example of a traction mechanism.

Care Belt 3

Figure 1C:
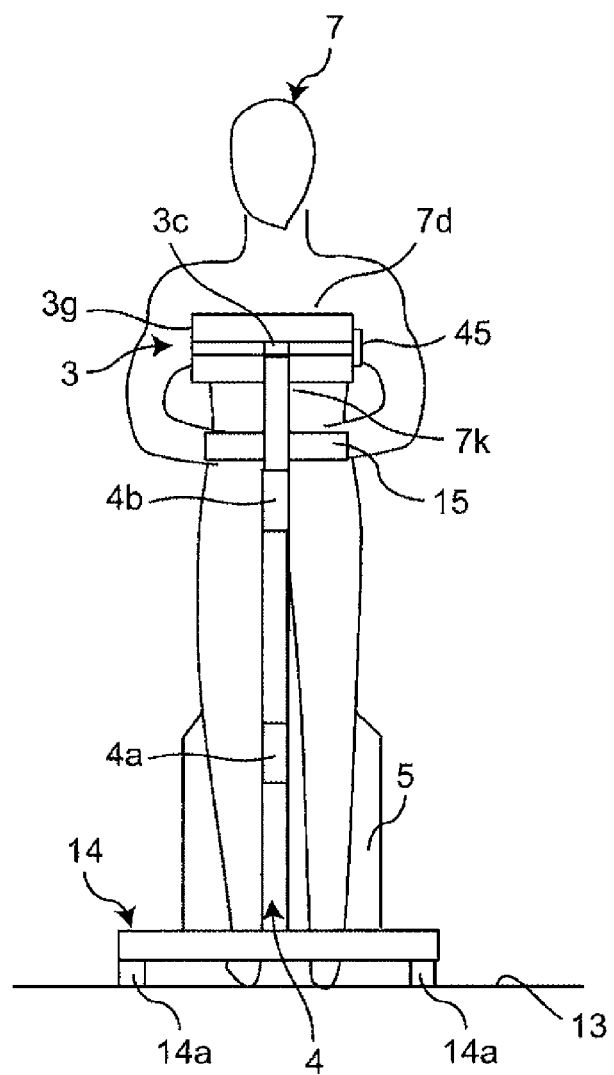
FIG. 1C is a schematic front view illustrating the care-receiver and the robot system according to the first embodiment of the present disclosure when the care-receiver is in a standing position.

As illustrated in FIGS. 1A to 1C, the care belt 3 includes a holding mechanism 3g and a connector 3c. The care belt 3 can be attached to the care-receiver 7. The holding mechanism 3g at least includes a holder 3a for holding a back 7b and both armpits 7g of the care-receiver 7. For example, the holder 3a is a belt-shaped hermetic tubular member. The connector 3c is located at a chest 7d of the care-receiver 7 and is connected to the holding mechanism 3g at a position in front of the care-receiver 7.

The holder 3a is capable of holding a portion of the care-receiver 7 including a part of the back 7b and both armpits 7g. To be more specific, in the example shown in the figures, the holder 3a is capable of holding a portion of the care-receiver 7 including a part the back 7b, both armpits 7g, and a pit-of-the-stomach 7k. When the holding mechanism 3g is attached to the care-receiver 7, the connector 3c can be positioned at the chest 7d of the care-receiver 7 (that is, in a region adjacent to the chest 7d or a region surrounding the chest 7d). Moreover, the connector 3c is connected to the holding mechanism 3g and is connectable to an end (for example, the back end) of the arm mechanism 4 (described below). Here, the chest 7d refers to the chest 7d and a surrounding region (that is, the chest 7d, a region surrounding the chest 7d, and a region within a predetermined distance (for example, 30 cm) in front of the chest 7d).

Figure 4A:
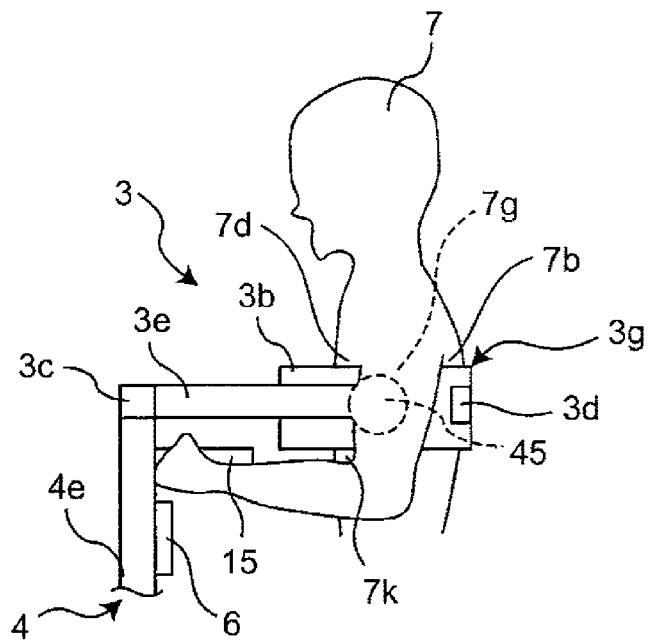
FIG. 4A is a side view illustrating a holding mechanism according to the first embodiment of the present disclosure when an attachment portion of a holding mechanism is closed.
Figure 4B:
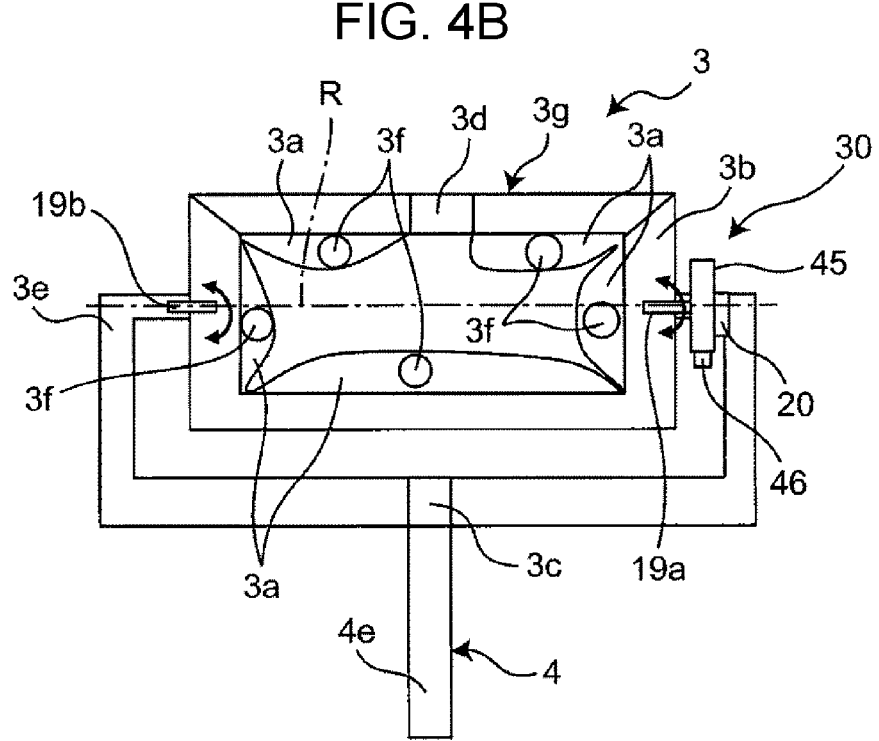
FIG. 4B is a plan view illustrating the holding mechanism according to the first embodiment of the present disclosure when the attachment portion of the holding mechanism is closed.
Figure 4C:
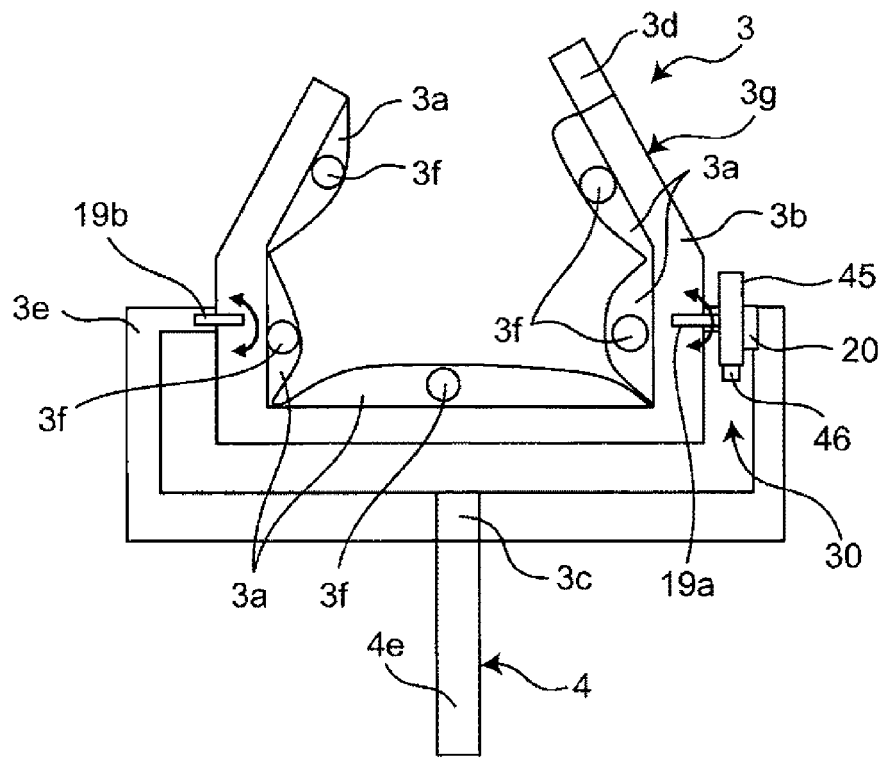
FIG. 4C is a plan view illustrating the holding mechanism according to the first embodiment of the present disclosure when the attachment portion of the holding mechanism is open.

FIGS. 4A, 4B, and 4C illustrate a more specific example of the holding mechanism 3g. The holding mechanism 3g shown in FIGS. 4A to 4C is attached to the care-receiver 7 in FIGS. 1A to 1C. FIGS. 4B and 4C are top views of the holding mechanism 3g.

As illustrated in FIGS. 4A to 4C, the rotational force applying mechanism 30 is mounted in the holding mechanism 3g. The holding mechanism 3g includes the holder 3a, a holder support member 3b, an arm support portion 3e, and an attachment portion 3d. The holder 3a is a belt-shaped hermetic tubular member. The holder support member 3b is a rectangular-frame-shaped member that supports the holder 3a. The arm support portion 3e supports the holder support member 3b and a backward-leaning motor 45 of the rotational force applying mechanism 30. The attachment portion 3d is used to open a back part of the holder support member 3b as illustrated in FIG. 4C when the care-receiver 7 attaches/detaches the holding mechanism 3g to/from their body.

For example, the holder 3a is an air bag that is a hermetic tubular member made of vinyl chloride or nylon. The inside of the holder 3a is filled with a gas, such as air. The holder 3a includes valves 3f for filling the inside of the holder 3a with air.

The holder support member 3b is a rigid rectangular-frame-shaped member that supports the holder 3a, which is a belt-shaped hermetic tubular member. The holder 3a is fixed to the inner surface of the holder support member 3b, and the holder support member 3b surrounds the outer surface of the holder 3a. In order to apply a rotational force to the care-receiver 7 through both armpits of the care-receiver 7, the holder support member 3b has a width in the vertical direction that is, for example, at least 10 to 20 cm so that the holder support member 3b can cover a part of the care-receiver 7 between the armpits and the pit-of-the-stomach.

The arm support portion 3e is a frame member that is C-shaped in plan view. The holder support member 3b is disposed between both ends of the arm support portion 3e via the rotational force applying mechanism 30. This structure will be described below when describing the rotational force applying mechanism 30. The connector 3c is fixed to a front central portion of the arm support portion 3e.

The attachment portion 3d, which is located at the back of the holder support member 3b, is an openable/closable portion that can be opened as illustrated in FIG. 4C when the care-receiver 7 attaches/removes the holding mechanism 3g to/from their body. For example, the attachment portion 3d may be a hook-and-loop fastener. In this case, because a left part and a right part of the holder support member 3b can be separated from each other at the attachment portion 3d, the care-receiver 7 can easily attach/detach the holding mechanism 3g to/from their body. In the example shown in FIG. 4C, the operation of attaching/detaching the holding mechanism 3g is performed at the back of the care-receiver 7. However, the length of the attachment portion 3d may be increased so that the operation can be performed at one of the armpits of the care-receiver 7. In this case, the operation of attaching/detaching the holding mechanism 3g can be performed at the armpit of the care-receiver 7 even if the care-receiver 7 has difficulty in reaching the back 7b by their hands.

As illustrated in FIGS. 4A and 4B, for example, the connector 3c is fixed to the arm support portion 3e, is connectable to the arm mechanism 4, and is located near the chest of the care-receiver 7. The connector 3c is fixed to an end of the arm mechanism 4 by using, for example, a screw. Any appropriate method may be used to connect the connector 3c to the end of the arm mechanism 4. For example, a buckle or the like may be used to removably connect the connector 3c to the end of the arm mechanism 4.

The holder 3a of the holding mechanism 3g, the holder support member 3b, and the arm support portion 3e are symmetrical in front view so that the arm mechanism 4 can apply a force evenly to a left part and a right part of the holding mechanism 3g via the connector 3c.

Rotational Force Applying Mechanism 30

The rotational force applying mechanism 30 is disposed between the holder support member 3b and the arm support portion 3e. The rotational force applying mechanism 30 applies a rotational force to the holder support member 3b so that the holder support member 3b rotates relative to the arm support portion 3e. In other words, the rotational force applying mechanism 30 applies a force to the holder support member 3b (that is, the holder 3a) so that a front lower part of the holder support member 3b rotates forward and upward and a rear upper part of the holder support member 3b rotates backward and downward relative to the arm support portion 3e. The rotational force applying mechanism 30 includes a first rotation shaft 19a, a second rotation shaft 19b, and the backward-leaning motor 45. The backward-leaning motor 45 is an example of a backward-leaning driver. To be specific, the first rotation shaft 19a and the second rotation shaft 19b are fixed to both ends (for example, positions corresponding to both armpits 7g of the care-receiver 7) of the holder support member 3b so as to protrude outward in the longitudinal direction of the holder support member 3b, which is rectangular-frame-shaped. One end of the first rotation shaft 19a is fixed to one end (for example, the right end in FIG. 4B) of the holder support member 3b, and the other end of the first rotation shaft 19a is connected to the rotation shaft of the backward-leaning motor 45. The other end of the first rotation shaft 19a faces one end (for example, the right end in FIG. 4B) of the arm support portion 3e, which is a C-shaped frame member. A casing of the backward-leaning motor 45 is fixed to an inner surface of the one end of the arm support portion 3e via a motor fixing portion 20. The second rotation shaft 19b of the holder support member 3b is rotatably supported by the other end (for example, the left end in FIG. 4B) of the arm support portion 3e. Thus, when the backward-leaning motor 45 rotates, the rotational force of the backward-leaning motor 45 is transmitted to the first rotation shaft 19a, the holder support member 3b, and the second rotation shaft 19b. Accordingly, the holder support member 3b rotates relative to the arm support portion 3e about the first rotation shaft 19a and the second rotation shaft 19b. In other words, the holder support member 3b rotates relative to the arm support portion 3e about an axis R extending through both armpits 7g of the care-receiver 7 (for example, about the first rotation shaft 19a and the second rotation shaft 19b) so that a front lower part of the holder support member 3b moves forward and upward and a rear upper part of the holder support member 3b moves backward and downward. Due to the rotation, the rotational force applying mechanism 30 can apply a rotational force from the holder support member 3b to both armpits 7g or the back 7b of the care-receiver 7, and can assist the care-receiver 7, to whom the holder support member 3b is attached and who is in a sitting position, in leaning the back 7b backward. The backward-leaning motor 45 can be controlled by the control device 11. To allow such control to be performed, the backward-leaning motor 45 includes a backward-leaning encoder 46 for detecting the rotation amount (for example, the rotation angle) of the rotation shaft of the backward-leaning motor 45. The control device 11 controls the backward-leaning motor 45 on the basis of information from the backward-leaning encoder 46.

Figure 4D:
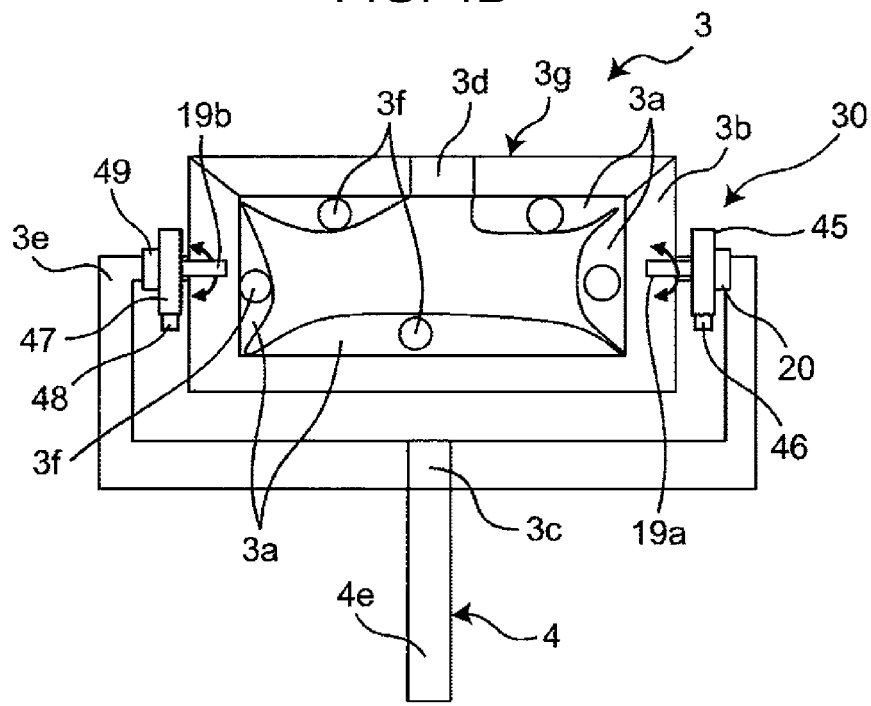
FIG. 4D is a plan view illustrating a holding mechanism according to a first modification of the first embodiment of the present disclosure when an attachment portion of the holding mechanism is closed.

As illustrated in FIG. 4D, as a first modification of the first embodiment, the rotational force applying mechanism 30 may include two motors, instead of one motor. That is, in the first modification, one end of the second rotation shaft 19b is fixed to the other end (for example, the left end in FIG. 4D) of the holder support member 3b, and the other end of the second rotation shaft 19b is connected to the rotation shaft of a second backward-leaning motor 47. The other end of the second rotation shaft 19b faces one end (for example, the left end in FIG. 4D) of the arm support portion 3e, which is a C-shaped frame member. A casing of the second backward-leaning motor 47 is fixed to an inner surface of the other end of the arm support portion 3e via a second motor fixing portion 49. Thus, when a controller 12 causes the backward-leaning motor 45 and the second backward-leaning motor 47 to rotate in synchronism, the rotational force of the backward-leaning motor 45 is transmitted to the first rotation shaft 19a and the holder support member 3b, and, at the same time, the rotational force of the second backward-leaning motor 47 is transmitted to the second rotation shaft 19b and the holder support member 3b. Accordingly, the holder support member 3b rotates relative to the arm support portion 3e about the first rotation shaft 19a and the second rotation shaft 19b. To allow such an operation to be performed, as with the backward-leaning motor 45, the second backward-leaning motor 47 includes a second backward-leaning encoder 48 for detecting the rotation amount (for example, the rotation angle) of the rotation shaft of the second backward-leaning motor 47. The control device 11 controls the second backward-leaning motor 47 on the basis of information from the second backward-leaning encoder 48.

Walking Mechanism 14

The walking mechanism 14 includes at least a pair of front and rear wheels 14a and 14b. For example, the walking mechanism 14 includes a rectangular plate 14e, a pair of front wheels 14a, a pair of rear wheels 14b, front brakes 14c, and rear brakes 14d. The walking mechanism 14 is placed on the floor 13. The pair of front wheels 14a, which are rotatable, are disposed at a pair of front corners of the rectangular plate 14e. The pair of rear wheels 14b, which are rotatable, are disposed at a pair of rear corners of the rectangular plate 14e. The front brakes 14c brake the front wheels 14a. The rear brakes 14d brake the rear wheels 14b. The arm mechanism 4 is disposed on an upper part of the walking mechanism 14. For example, in the state illustrated in FIG. 3C, the pair of front wheels 14a and the pair of rear wheels 14b rotate when the care-receiver 7 applies a force in the forward direction (the leftward direction in FIG. 3C) to the walking mechanism 14. Thus, the walking mechanism 14 can assist the care-receiver 7 in walking. In this example, the pair of front wheels 14a and the pair of rear wheels 14b rotate when the care-receiver 7 pushes the walking mechanism 14. For example, either or both of the pair of front wheels 14a and the pair of rear wheels 14b may be connected to a motor that assists the care-receiver 7 in applying a pushing force so that the care-receiver 7 can walk easily. For example, the front brakes 14c or the rear brakes 14d may be electromagnetic brakes. In this case, the front wheels 14a or the rear wheels 14b can be applied or released by using the input interface 6. The front wheels 14a or the rear wheels 14b can be braked by activating the front brakes 14c or the rear brakes 14d. The front wheels 14a or the rear wheels 14b can be released by deactivating the front brakes 14c or the rear brakes 14d. The front brakes 14c and the rear brakes 14d need not be electromagnetic brakes and may be manual brakes.

Arm Mechanism 4

The arm mechanism 4 includes a robot arm that is connected to the connector 3c and that pulls the connector 3c. The robot arm is an example of a traction mechanism. For example, the arm mechanism 4 is disposed on an upper part of the walking mechanism 14. An end of the arm mechanism 4 is connected to the holder mechanism 3g via the connector 3c. The arm mechanism 4 is, for example, a robot arm having two degrees of freedom. The arm mechanism 4 includes a first motor 41, a first encoder 43 that detects the number of rotations (for example, the rotation angle) of the rotation shaft of the first motor 41, a second motor 42, and a second encoder 44 that detects the number of rotations (for example, the rotation angle) of the rotation shaft of the second motor 42. The control device 11 controls the first motor 41 and the second motor 42 on the basis of the position information of the arm mechanism, which is converted from rotation angle information from the first encoder 43 and the second encoder 44. For example, this control enables the following. As illustrated in FIGS. 3A to 3C, when assisting the care-receiver 7 in lifting their buttocks 7e off the seat 5 from a sitting position, the robot system 1 can pull the holder support member 3b of the holding mechanism 3g in an upward and forward direction from the care-receiver 7 and subsequently in the upward direction.

To be more specific, the arm mechanism 4, which includes a plurality of joints, is a robot arm including a first arm 4c, a second arm 4d, a third arm 4e, a first driver 4a, and a second driver 4b. A lower end of the first arm 4c is fixed to a front central part of the rectangular plate 14e so as to extend upward from the rectangular plate 14e. A front end of the second arm 4d is rotatably connected to an upper end of the first arm 4c through a first joint, in which the first driver 4a is disposed. A back end of the second arm 4d is rotatably connected to a lower end of the third arm 4e through a second joint, in which the second driver 4b is disposed. An upper end of the third arm 4e is fixed to the connector 3c at a front end of the arm support portion 3e so that the axial directions of the third arm 4e and the arm support portion 3e are perpendicular to each other and so that the third arm 4e and the arm support portion 3e intersect in an L-shape.

The first driver 4a is disposed in the first joint between the first arm 4c and the second arm 4d. The first driver 4a includes, for example, the first motor 41, which rotates the second arm 4d relative to the first arm 4c, and the first encoder 43, which detects the rotation angle information of the first motor 41. Thus, under the control by the controller 12 (described below), the first driver 4a can rotate the second arm 4d by a predetermined angle relative to the first arm 4c and move the second arm 4d to a desired position. The second driver 4b is disposed in the second joint between the second arm 4d and the third arm 4e. The second driver 4b includes, for example, the second motor 42, which rotates the third arm 4e relative to the second arm 4d, and the second encoder 44, which detects the rotation angle information of the second motor 42. Thus, under the control by the controller 12 (described below), the second driver 4b can rotate the third arm 4e by a predetermined angle relative to the second arm 4d and move the third arm 4e to a desired position.

The input interface 6, such as an operation panel on which buttons and the like are arranged, is disposed on the third arm 4e. By disposing the input interface 6 in this way, the care-receiver 7 in a sitting position can operate the input interface 6 from a side of the arm mechanism 4. Thus, by using the input interface 6, the care-receiver 7 can input various instructions (by, for example, pressing buttons) to brake on or off the wheels of the robot system 1 (for example, the front wheels and the rear wheels) and to turn on or off the robot system 1, and can press or release a standing-motion start button. A handle 15 protrudes in the backward direction (for example, toward the care-receiver 7) from a middle part of the third arm 4e. The care-receiver 7 grasps the handle 15 with both hands when the care-receiver 7 performs a sitting motion or a standing motion. The handle 15 may have a sufficient length so that the care-receiver 7 can place their elbows on the handle 15. In this case, the care-receiver 7 can grasp the handle 15 when standing up, and the care-receiver 7 can walk more stably by placing their elbows on the handle 15. The arm support portion 3e may include a cushioning member, made of urethane foam or the like, in an upper part thereof. In this case, even if the care-receiver 7 falls forward and the face or the upper body of the care-receiver 7 is hit by the arm support portion 3e, the impact can be reduced.

The control device 11 includes a database I/O unit 9, a timer 16, and the controller 12. For example, the controller 12 controls a rotational motion of the rotational force applying mechanism 30 and a pulling motion of the arm mechanism 4 so that, after the arm mechanism 4 has started the pulling motion, the rotational force applying mechanism 30 rotates the front lower part of the holder 3a upward and the rear upper part of the holder 3a downward at the same time as the arm mechanism 4 pulls the connector 3c forward and upward from the care-receiver 7, and subsequently the arm mechanism 4 pulls the connector 3c upward.

For example, the control device 11 performs control so as to assist the care-receiver 7 in performing a standing motion by independently controlling the first driver 4a and the second driver 4b of the arm mechanism 4 as follows: the arm mechanism pulls the holder 3a of the holding mechanism 3g forward and upward from the care-receiver 7 via the holder support member 3b so that at least the buttocks 7e of the care-receiver 7 in a sitting position leave the seat 5; and, subsequently, the arm mechanism 4 pulls the holder 3a via the holder support member 3b upward from the care-receiver 7 until the care-receiver 7 assumes a standing position. Moreover, at the same time as the arm mechanism 4 pulls the holder 3a forward and upward, the control device 11 controls the backward-leaning motor 45 of the rotational force applying mechanism 30 so as to rotate the holder 3a via the holder support member 3b at both armpits 7g of the care-receiver 7 in the clockwise direction in the side view shown in FIG. 3A, thereby assisting the upper body of the care-receiver 7 in leaning backward.

To be more specific, the control device 11 performs control as follows: the arm mechanism 4 pulls the holder support member 3b of the holding mechanism 3g so as to pull the care-receiver 7, who is in a sitting position, forward and upward as indicated by an arrow in FIG. 3A; and, at the same time, the rotational force applying mechanism 30 applies a rotational force C in the clockwise direction in FIG. 3A to both armpits 7g of the care-receiver 7 so that the upper body of the care-receiver 7 becomes inclined backward and leans backward relative to the waist of the care-receiver 7. In this way, by applying a rotational force for assisting the care-receiver 7 in leaning backward at the same time as the arm mechanism 4 pulls the holder support member 3b forward and upward, due to the forward and upward pulling operation, the care-receiver 7 can easily lift their buttocks off the seat as the pelvis is moved forward and upward, and, due to the backward-leaning rotational force, the care-receiver 7 can easily stand up as the spine leans backward. Thus, for example, compared with a case where only the forward pulling operation is performed, when the backward-leaning rotational operation is performed at the same time as performing the forward-and-upward pulling operation, the care-receiver 7 can easily lift the buttocks 7e off the seat 5 5 without fail. Next, the holder support member 3b is pulled upward as indicated by an arrow in FIG. 3B so that the buttocks 7e of the care-receiver 7 leave the seat 5, and the robot system 1 assists the care-receiver 7 in performing a series of motions until the care-receiver 7 assumes a standing position shown in the FIG. 3C. Hereinafter, the term "first state" refers to a state from the time when the control operation is started to the time when the buttocks 7e of the care-receiver 7 leave the seat 5. The term "second state" refers a state from the time when the first state ends to the time when the care-receiver 7 assumes a standing position.

Timer 16

The timer 16 outputs instructions for operating the database I/O unit 9 and the controller 12 to the database I/O unit 9 and the controller 12 at predetermined intervals (for example, every 1 msec).

Input Interface 6

The input interface 6 is disposed, for example, on the arm mechanism 4. The input interface 6 is an operation interface that is used to turn on or turn off the robot system 1, to apply or release the front brakes 14c and the rear brakes 14d, and to instruct starting or stopping of a standing motion. The input interface 6 includes, for example, buttons and the like.

Motion Information Database 8

The controller 12 is activated on the basis of instructions from the timer 16. Then, the controller 12 and the database I/O unit 9 generate the position information of the arm mechanism 4 and the orientation information of the rotational force applying mechanism 30 (that is, the holder 3a) at predetermined intervals (for example, every 1 msec) in accordance with instructions from the timer 16. To be specific, the position information is converted from the rotation angle information from each of the first encoder 43 and the second encoder 44. The orientation information is, for example, rotation angle information from the backward-leaning encoder 46. In the first embodiment, the position information and the orientation information, which are generated as described above, and the time are output to the motion information database 8 via the database I/O unit 9 as motion information and stored in the motion information database 8. In the first embodiment, the motion information is generated beforehand by using the input interface 6 and the like and stored.

FIG. 5A shows an example of the contents of the information stored in the motion information database 8.

(1) The column "TIME" represents information about the time when the arm mechanism 4 and the rotational force applying mechanism 30 are moving. In the first embodiment, the time is measured in milliseconds (msec).

(2) The column "POSITION AND ORIENTATION" represents the following: the position information of the arm mechanism 4, which is converted from the angle information detected by the first and second encoders 43 and 44 of the arm mechanism 4 or the like; and the orientation information (for example, the rotation angle information) of the holder support member 3b (that is, the holder 3a), which is detected by the backward-leaning encoder 46 of the rotational force applying mechanism 30. To be specific, the "position" is represented by xy coordinates, where the x-axis is an axis extending in the direction in which the robot system 1 travels (for example, the front-back direction) and z-axis is the vertical axis. The "orientation" is represented by the rotation angle of the holder support member 3b of the holding mechanism 3g. In the first embodiment, the position is measured in meter (m), and the angle, which is the orientation information, is measured in radian (rad).

Database I/O Unit 9

The database I/O unit 9 performs input and output of data (that is, information) between the motion information database 8 and the controller 12.

Controller 12

The controller 12 independently moves the first motor 41 and the second motor 42 of the arm mechanism 4 and the backward-leaning motor 45 of the rotational force applying mechanism 30 in accordance with the motion information input from the database I/O unit 9. In addition, the controller 12 controls the front brakes 14c and the rear brakes 14d on the basis of instructions for applying/releasing the front brakes 14c and the rear brakes 14d, which are input through the input interface 6.

Figure 6A:
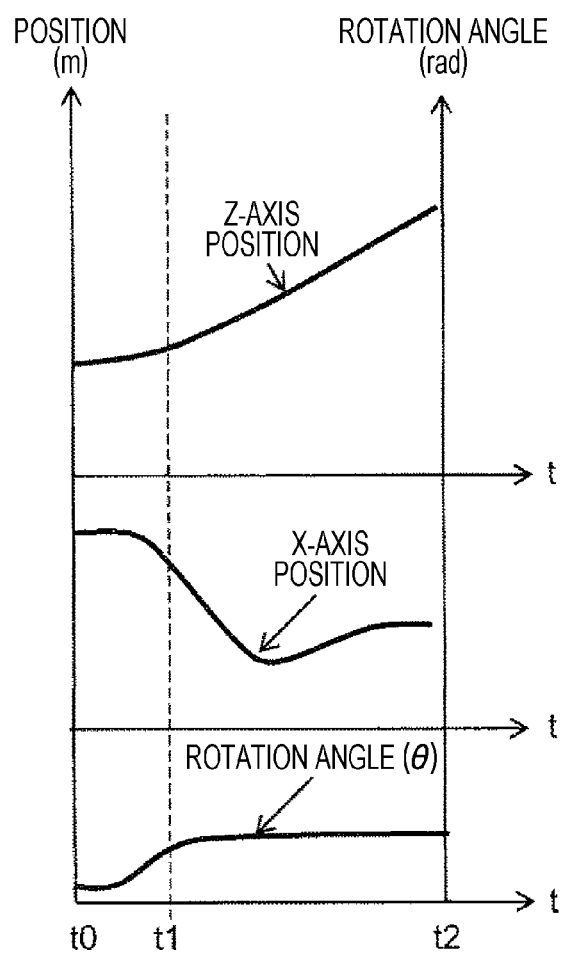
FIG. 6A is a graph representing an example of motion control that is performed by a controller according to the first embodiment of the present disclosure.

Referring to FIG. 6A, control that is performed by the controller 12 on the basis of motion information will be described. FIG. 6A shows motion information that is used to assist the care-receiver 7 in performing a standing motion. The horizontal axis represents the time. One of the vertical axes represents the x-axis position information and the z-axis position information; and the other vertical axis represents the rotation angle θ of the backward-leaning motor 45, which is the orientation information. The period from t0 to t1 corresponds to the first state from the time when the control operation is started to the time when the buttocks 7e of the care-receiver 7 leave the seat 5. The period from t1 to t2 corresponds to the second state from the time when the first state ends to the time when the care-receiver 7 reaches a standing position.

Figure 7A:
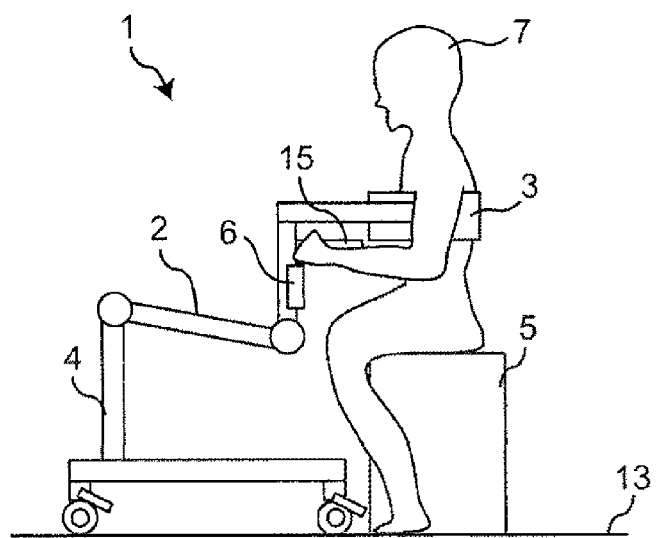
FIG. 7A illustrates a motion of the robot system according to the first embodiment of the present disclosure.
Figure 7B:
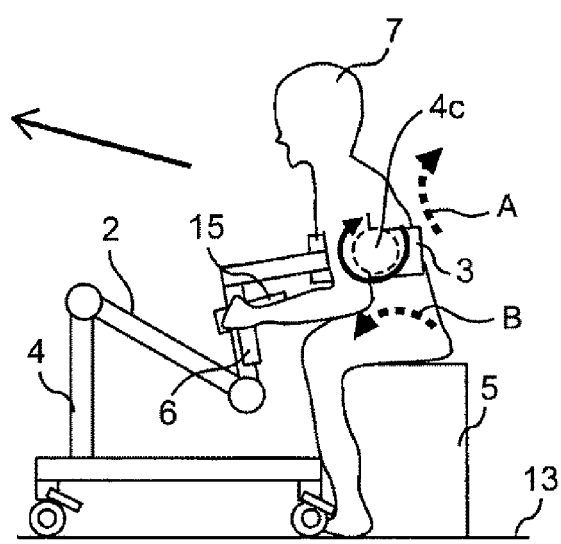
FIG. 7B illustrates a motion of the robot system according to the first embodiment of the present disclosure.

For example, when the care-receiver 7 is in a sitting position on the seat 5 as illustrated in FIG. 7A, the controller 12 independently controls the first motor 41 and the second motor 42 so that the arm mechanism 4 moves forward and upward as indicated by a left-up arrow in FIG. 7B. At the same time, as indicated by a clockwise arrow FIG. 7B, the controller 12 controls the backward-leaning motor 45 (for example, as in the first state in the period from t0 to t1 in FIG. 6A) so that the holder support member 3b performs a backward-leaning rotational motion (for example, a rotational motion such that a front part of the holder support member 3b moves upward a rear part of the holder support member 3b moves downward about the axis R extending through both armpits 7g of the care-receiver 7). Referring to FIG. 6A, in the period from t0 to t1, the arm mechanism 4 moves the x-axis position of the holding mechanism 3g forward and upward with increasing velocity (see, for example, the acceleration of the holding mechanism 3g calculated from the x-axis position in the period from t0 to t1). At the same time, the backward-leaning motor 45 causes the holder support member 3b to perform a backward-leaning rotation (for example, see the graph of the rotation angle θ in FIG. 6A). That is, the controller 12 controls the arm mechanism 4 so that the arm mechanism 4 pulls the connector 3c forward and upward from the care-receiver 7 with increasing velocity. As a result, the arm mechanism 4 causes the pelvis of the care-receiver 7 to tilt forward as indicated by a counterclockwise dotted-line arrow B in FIG. 7B by pulling the holding mechanism 3g forward and upward. Moreover, the backward-leaning motor 45 causes the upper body of the care-receiver 7 to lean backward as indicated by a clockwise dotted-line arrow A by rotating the holder support member 3b in the clockwise direction in FIG. 7B so that the upper body of the care-receiver 7 leans backward with respect to the waist of the care-receiver 7. Note that the aforementioned acceleration control can be also used in embodiments and modifications described below.

Thus, the care-receiver 7 can easily stand up from the seat 5, because the arm mechanism 4 causes the pelvis of the care-receiver 7 to tilt forward to assist the care-receiver 7 in lifting their buttocks off the seat 5 and, at the same time, the rotational force applying mechanism 30 causes the upper body of the care-receiver 7 to lean backward. By causing the back of the care-receiver 7 to lean backward, the care-receiver 7 can smoothly shift from a sitting position to a standing position without leaning forward to a large degree.

Figure 7C:
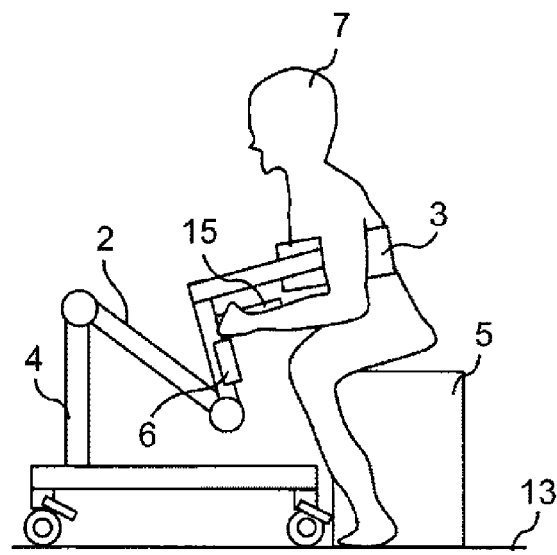
FIG. 7C illustrates a motion of the robot system according to the first embodiment of the present disclosure.
Figure 7D:
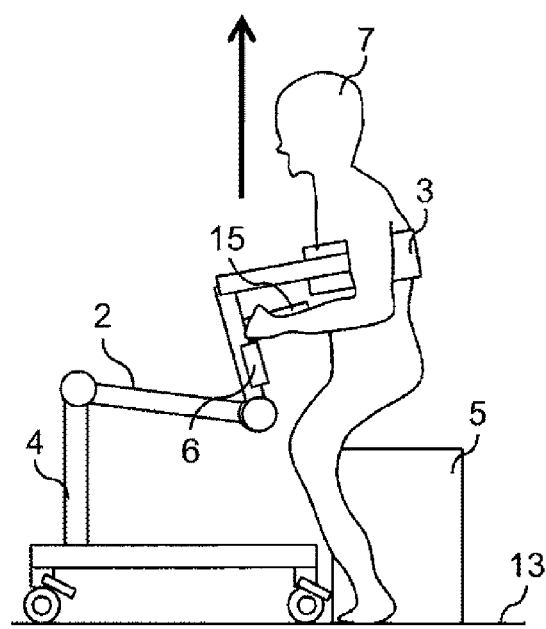
FIG. 7D illustrates a motion of the robot system according to the first embodiment of the present disclosure.
Figure 7E:
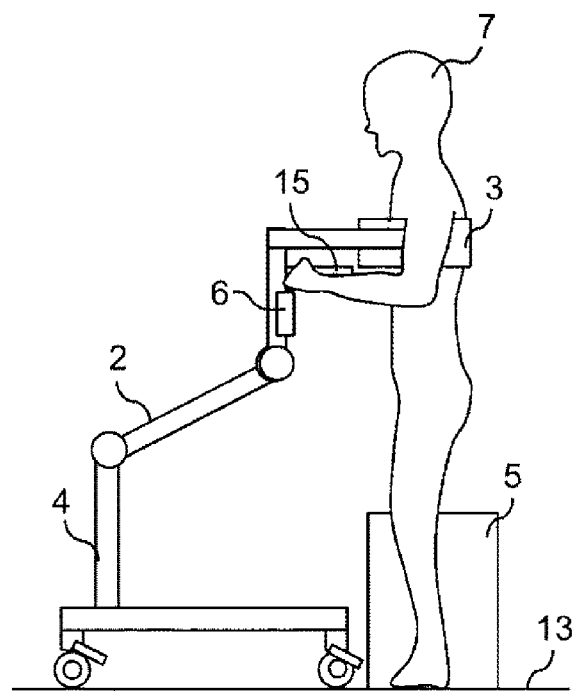
FIG. 7E illustrates a motion of the robot system according to the first embodiment of the present disclosure.

Next, as illustrated in FIG. 7C, when the buttocks 7e of the care-receiver 7 leave the seat 5 (that is, at the end of the first state), the controller 12 controls the arm mechanism 4 so that the arm mechanism 4 moves upward as indicated by an up arrow FIG. 7D. At the same time, the controller 12 controls the rotational force applying mechanism 30 so that the rotational force applying mechanism 30 rotates the holder support member 3b (for example, as in the second state from time t1 to time t2 in FIG. 6A). Then, due to the upward motion of the arm mechanism 4, the care-receiver 7 is assisted in moving upward and finishes the standing motion as illustrated in FIG. 7E. At this time, the care-receiver 7 is in a standing position.

Hereinafter, motions of the robot system 1 controlled by the controller 12 will be described.

Referring the flowchart shown in FIG. 8, the motions of the arm mechanism 4 of the robot system 1 and corresponding motions of the care-receiver 7, which are illustrated in FIGS. 7A to 7E, will be described.

First, as illustrated in FIG. 7A, the care-receiver 7 sits on the seat 5, such as a bed, a chair, or a toilet seat, which is placed on the floor 13.

Next, a caregiver, for example, moves the robot 20A of the robot system 1 to a position in front of the care-receiver 7, who is sitting on the seat 5.

Figure 8:
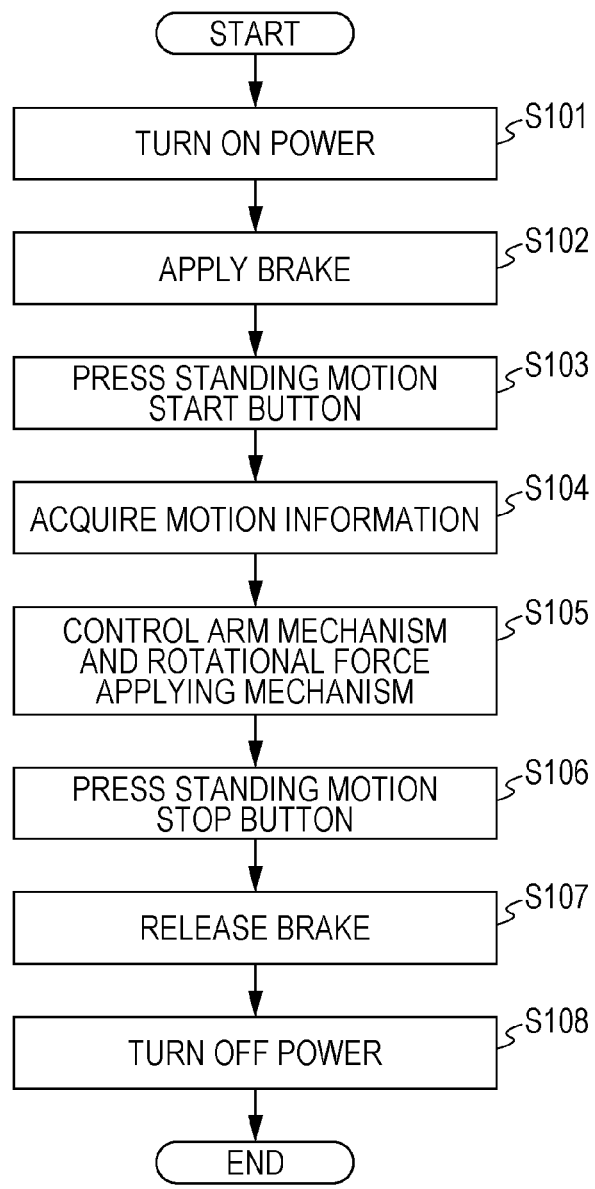
FIG. 8 is a flowchart showing motion control that is performed by the controller according to the first embodiment of the present disclosure.

In step S101 of FIG. 8, the care-receiver 7 turns on the power of the robot system 1 by using the input interface 6 of the robot 20A.

In step S102, the care-receiver 7 applies the front brakes 14c and the rear brakes 14d by using the input interface 6, and the controller 12 brakes the front wheels 14a and the rear wheels 14b of the walking mechanism 14 so that the wheels 14a and 14b will not rotate. By doing so, when the arm mechanism 4 pulls the holding mechanism 3g via the connector 3c, the walking mechanism 14 does not move, and a force from the arm mechanism 4 can be transmitted to the holding mechanism 3g via the connector 3c without fail.

Next, the care-receiver 7 attaches the holding mechanism 3g of the care belt 3, which is connected to the arm mechanism 4, to their body and grips the handle 15 with both hands.

In step S103, the care-receiver 7 presses the standing motion start button of the input interface 6 to activate the robot system 1. In this example, the robot system 1 moves only while the standing motion start button is being pressed, and the robot system 1 stops moving when the standing motion start button is released. In the following steps S104 to S106, the control device 11 of the robot system 1 independently controls the first driver 4a and the second driver 4b of the arm mechanism 4, and the control device 11 controls the backward-leaning motor 45 of the rotational force applying mechanism 30. By doing so, the robot system 1 assists the care-receiver 7 in lifting the buttocks 7e off the seat 5 as shown in FIG. 3B and in standing up from a sitting position shown in FIG. 3A to a standing position shown in FIG. 3C.

In step S104, the controller 12 acquires the motion information from the database I/O unit 9.

In step S105, the controller 12 independently controls the first motor 41, the second motor 42, and the backward-leaning motor 45 so that the arm mechanism 4 and the rotational force applying mechanism 30 move in accordance with the motion information acquired from the database I/O unit 9. For example, the controller 12 controls the arm mechanism 4 and the rotational force applying mechanism 30 as follows: the arm mechanism 4 moves forward and upward as illustrated in FIG. 7B from a state in which the care-receiver 7 is in a sitting position shown in FIG. 7A; and at the same time, the backward-leaning motor 45 of the rotational force applying mechanism 30 causes the holder support member 3b to perform a backward-leaning rotational motion (that is, a rotational motion such that a front lower part of the holder 3a is rotated forward and upward and a rear upper part of the holder 3a is rotated backward and downward). As a result, as illustrated in FIG. 7B, the arm mechanism 4 causes the pelvis of the care-receiver 7 to tilt forward as indicated by the counterclockwise dotted-line arrow B by pulling the holding mechanism 3g via the connector 3c forward and upward. Moreover, the backward-leaning motor 45 causes the upper body of the care-receiver 7 to lean backward as indicated by the clockwise dotted-line arrow A by causing the holder support member 3b of the holding mechanism 3g to perform a backward-leaning rotation as indicated by the clockwise dotted-line arrow A. Thus, the care-receiver 7 can easily stand up from the seat 5, because the arm mechanism 4 causes the pelvis of the care-receiver 7 to tilt forward to assist the care-receiver 7 in lifting their buttocks off the seat 5 and, at the same time, the rotational force applying mechanism 30 causes the upper body of the care-receiver 7 to lean backward. By causing the back of the care-receiver 7 to lean backward, the care-receiver 7 can smoothly shift from a sitting position to a standing position without leaning forward to a large degree.

The controller 12 may control the first motor 41 and the second motor 42 of the arm mechanism 4 so that the pulling velocity gradually increases forward and upward, while the arm mechanism 4 pulls the holder support member 3b forward and upward via the connector 3c (in other words, in the first state from the time when the pulling motion is started to the time when the buttocks 7e of the care-receiver 7 leave the seat 5). In this case, it is possible to accelerate the backward leaning motion of the upper body of the care-receiver 7 and the forward tilting motion of the pelvis of the care-receiver 7 and to more smoothly assist the care-receiver 7 in performing a standing motion.

Next, as illustrated in FIG. 7C, when the buttocks 7e of the care-receiver 7 leave the seat 5 (that is, at the end of the first state), the controller 12 controls the arm mechanism 4 so that the arm mechanism 4 moves upward as indicated by the up arrow FIG. 7D. Then, due to the upward motion of the arm mechanism 4, the care-receiver 7 is assisted in moving upward and finishes the standing motion as illustrated in FIG. 7E. At this time, the care-receiver 7 is in a standing position. When the buttocks 7e of the care-receiver 7 leave the seat 5 (that is, at the end of the first state), the control device 11 may continue driving the backward-leaning motor 45 to be at a constant rotation angle or may stop the backward-leaning motor 45.

In step S106, the care-receiver 7 releases the button of the input interface 6 to stop the standing-motion control performed by the controller 12, that is, to stop the operation of the arm mechanism 4 and the rotational force applying mechanism 30. Note that, even before step S106, the care-receiver 7 can stop the operations of the arm mechanism 4 and the rotational force applying mechanism 30, which are controlled by the controller 12, by releasing the button of the input interface 6.

In step S107, the care-receiver 7 releases the front brakes 14c and the rear brakes 14d by using the input interface 6.

In step S108, the care-receiver 7 turns off the power by using the input interface 6. The care-receiver 7, who has assumed a standing position as illustrated in FIG. 7E, can use the walking mechanism 14 as a walker, which assists the care-receiver 7 in walking, by applying a forward force to the walking mechanism 14 and thereby rotating the front wheels 14a and the rear wheels 14b.

Advantageous Effects of First Embodiment

The robot system 1 includes the arm mechanism 4, which includes the holding mechanism 3g, and the control device 11, which controls the arm mechanism 4 and the rotational force applying mechanism 30. Therefore, the controller 12 can control the arm mechanism 4 so that the arm mechanism 4 pulls the care belt 3 forward and upward and can control the rotational force applying mechanism 30 so that the rotational force applying mechanism 30 causes the holding mechanism 3g to perform a backward-leaning rotation. As a result, in the initial stage of a standing motion (that is, in the first state in which the care-receiver 7, who has been in a sitting position, lifts the buttocks 7e off the seat 5), the robot system 1 can reduce the degree of forward leaning of the care-receiver 7 and can assist the care-receiver 7 in performing a standing motion similar to that of an able-bodied adult person.

Second Embodiment

Figure 9:
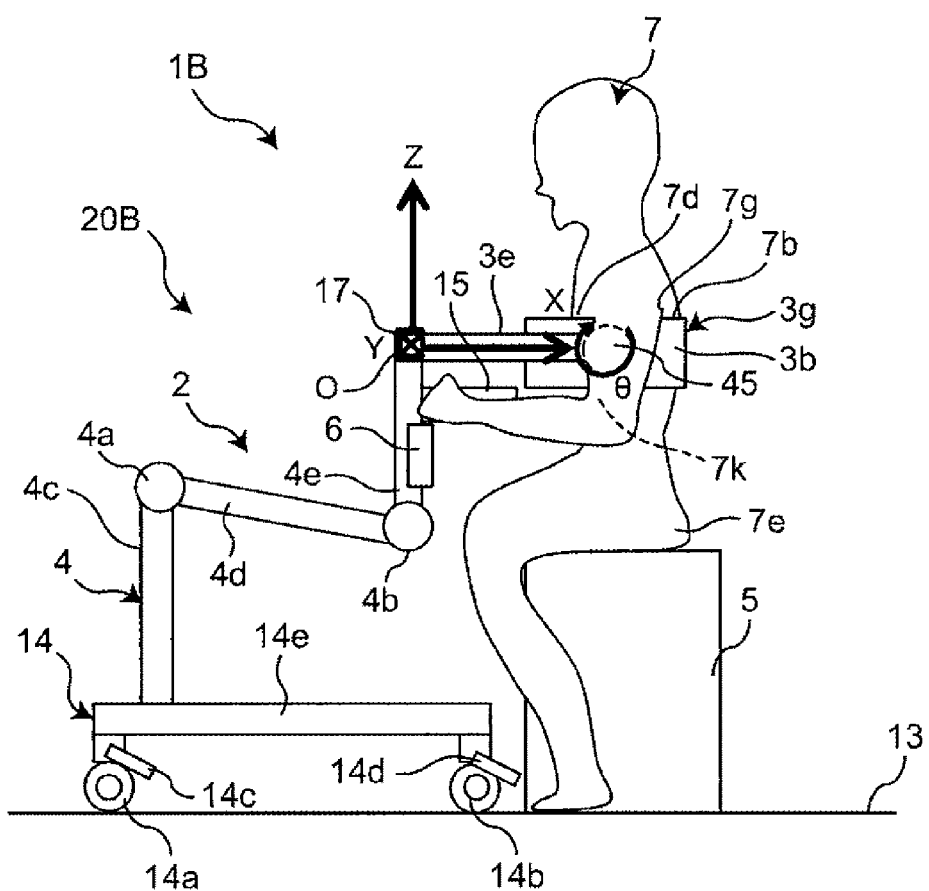
FIG. 9 is a schematic view illustrating a robot system according to a second embodiment of the present disclosure.

FIG. 9 is a side view of a robot system 1B that is an example of a standing motion assist system (that is, a standing motion assist apparatus) according to a second embodiment of the present disclosure, illustrating an exemplary operation of a robot 20B that assists a care-receiver 7 in moving from a sitting position to a standing position. FIG. 10 is a block diagram of the robot system 1B according to the second embodiment.

The robot system 1B according to the second embodiment differs from the robot system 1 according to the first embodiment in that the robot system 1B includes a force detector 17, which is an example of a force acquirer, and a motion information generator 10. Instead of acquiring motion information from the database I/O unit 9, the motion information generator 10 generates motion information on the basis of a force detected by the force detector 17, the position information, and the orientation information. The force detector 17 acquires force information about an external force applied to the arm mechanism 4. The motion information generator 10 generates motion information of the arm mechanism 4 from the force information acquired by the force detector 17 and position information acquired by the first encoder 43 and the second encoder 44 (described below). Thus, in the second embodiment, a controller 12B (described bellow) controls the motion of the arm mechanism 4 on the basis of the motion information generated by the motion information generator 10. Hereinafter, the details of the second embodiment will be described.

The robot 20B of the robot system 1B is placed on the floor 13, as with the robot 20A according to the first embodiment shown in FIGS. 1A to 2. The robot 20B includes the body mechanism 2, a control device 11B, the input interface 6, and the force detector 17.

The body mechanism 2 includes the arm mechanism 4, the care belt 3, and the walking mechanism 14, as in the first embodiment.

The control device 11B includes the database I/O unit 9, the timer 16, the controller 12B, and the motion information generator 10.

Descriptions of the walking mechanism 14, the care belt 3, the timer 16, and the input interface 6, which are the same as those of the first embodiment, will be omitted.

The care-receiver 7 is held by the holding mechanism 3g of the care belt 3 as in the first embodiment. When in a sitting position, the care-receiver 7 is sitting on the seat 5 (for example, a bed, a chair, a toilet seat, or the like). The input interface 6, which an operation panel or the like on which buttons and the like are arranged, is disposed on a side surface of the arm mechanism 4 as with the first embodiment.

The differences from the first embodiment will be described below in detail.

Force Detector 17

The force detector 17 is disposed on the arm mechanism 4. The force detector 17 detects a force that the care-receiver 7 applies to the arm mechanism 4. The force detector 17 starts detecting the force after the care-receiver 7 inputs an instruction for activating the robot system 1B through the input interface 6 (by, for example, pressing a button) to start a control operation of the control device 11B of the robot system 1B. The force detector 17 detects a force that the care-receiver 7 applies to the arm mechanism 4, the motion information generator 10 generates motion information on the basis of the force detected by the force detector 17 and the position of the arm mechanism 4, and the controller 12B controls the motions of the arm mechanism 4 and the rotational force applying mechanism 30.

To be specific, as illustrated in FIG. 9, the force detector 17 is disposed in the connector 3c, which is a junction between the upper end of the third arm 4e and the front end of the arm support portion 3e of the arm mechanism 4. The force detector 17 detects information about a force applied to the arm mechanism 4 from the outside (for example, from the care-receiver 7). The information detected by the force detector 17 and the time are stored in the motion information database 8 via the database I/O unit 9. For example, the force detector 17 is a three-direction force sensor that can measure the following: a force in the up-down direction; a force in the front-back direction of the robot system 1B; and a rotation moment in the direction in which the backward-leaning motor 45 rotates, that is, about the y-axis.

Arm Mechanism 4

As in the first embodiment, the arm mechanism 4 is disposed on an upper part of the walking mechanism 14. For example, the arm mechanism 4 is an arm having two degrees of freedom and including the first motor 41 and the first encoder 43 in a first joint and the second motor 42 and the second encoder 44 in a second joint. As in the first embodiment, the control device 11B controls the first motor 41 and the second motor 42 on the basis of information from the first encoder 43 and the second encoder 44, thereby driving the robot system 1B, for example, as illustrated in FIGS. 3A to 3C. As in the first embodiment, the arm mechanism 4 includes the handle 15, which can be gripped by the care-receiver 7 in a sitting position or in a standing position. The first encoder 43 and the second encoder 44 function as an example of a position acquirer that acquires position information of the arm mechanism 4.

Rotational Force Applying Mechanism 30

As in the first embodiment, the rotational force applying mechanism 30 is disposed between the holder support member 3b and the arm support portion 3e and rotates the arm support portion 3e relative to the holder support member 3b. As described below, the controller 12B can control the rotation of the holding mechanism 3g by controlling the backward-leaning motor 45 on the basis of motion information generated by the motion information generator 10 and stored in the motion information database 8.

Motion Information Database 8

As in the first embodiment, the controller 12B is activated on the basis of instructions from the timer 16. Then, the controller 12B and the database I/O unit 9 generate the position information of the arm mechanism 4 and the orientation information of the rotational force applying mechanism 30 (that is, the holder 3a) at predetermined intervals (for example, every 1 msec) in accordance with instructions from the timer 16. To be specific, the position information is converted from the rotation angle information from each of the first encoder 43 and the second encoder 44. The orientation information is, for example, rotation angle information from the backward-leaning encoder 46. The position information and the orientation information, which are generated as described above, and the time are output to the motion information database 8 via the database I/O unit 9 and stored in the motion information database 8. In the second embodiment, as described below, the motion information generator 10 generates the motion information on the basis of the force information detected by the force detector 17, the position information, and the time information. Then, the motion information is stored in the motion information database 8.

FIG. 11 shows an example of the contents of the information stored in the motion information database 8.

(1) The column "TIME" represents information about the time when the arm mechanism 4 is moving. In the second embodiment, the time is measured in milliseconds (msec).

(2) The column "POSITION AND ORIENTATION" represents the following: the position information of the arm mechanism 4, which is converted from the angle information detected by the first and second encoders 43 and 44 of the arm mechanism 4 or the like; and the orientation information (for example, the rotation angle information) of the holder support member 3b, which is detected by the backward-leaning encoder 46 of the rotational force applying mechanism 30. To be specific, as illustrated in FIG. 9, the "position" is represented by xy coordinates, where the positive x-axis direction is opposite to the direction in which the robot system 1B travels, the positive z-axis direction is the upward direction, and the origin is at one end of the arm mechanism 4. The "orientation" is represented by the rotation angle of the y-axis. In the second embodiment, the position is measured in meter (m), and the angle (that is, the orientation) is measured in radian (rad).

(3) The column "FORCE" represents the force that is applied to the arm mechanism 4 and that is detected by the force detector 17 of the arm mechanism 4. To be specific, the "force" is information about a force that is composed of an x-direction force and a z-direction force, where the positive x-axis direction is opposite to the direction in which the robot system 1B travels and the positive z-direction is the upward direction. In the second embodiment, the force is measured in newton (N).

Database I/O Unit 9

The database I/O unit 9 performs input and output of data (information) between the motion information database 8 and the controller 12, the force detector 17, and the motion information generator 10.

Motion Information Generator 10

The motion information generator 10 acquires time information, position information, orientation information, and force information, which are stored in the motion information database 8, through the database I/O unit 9. The motion information generator 10 generates the motion information of the arm mechanism 4 on the basis of the position information, the orientation information, and the force information; and stores the motion information in the motion information database 8.

Figure 12B:
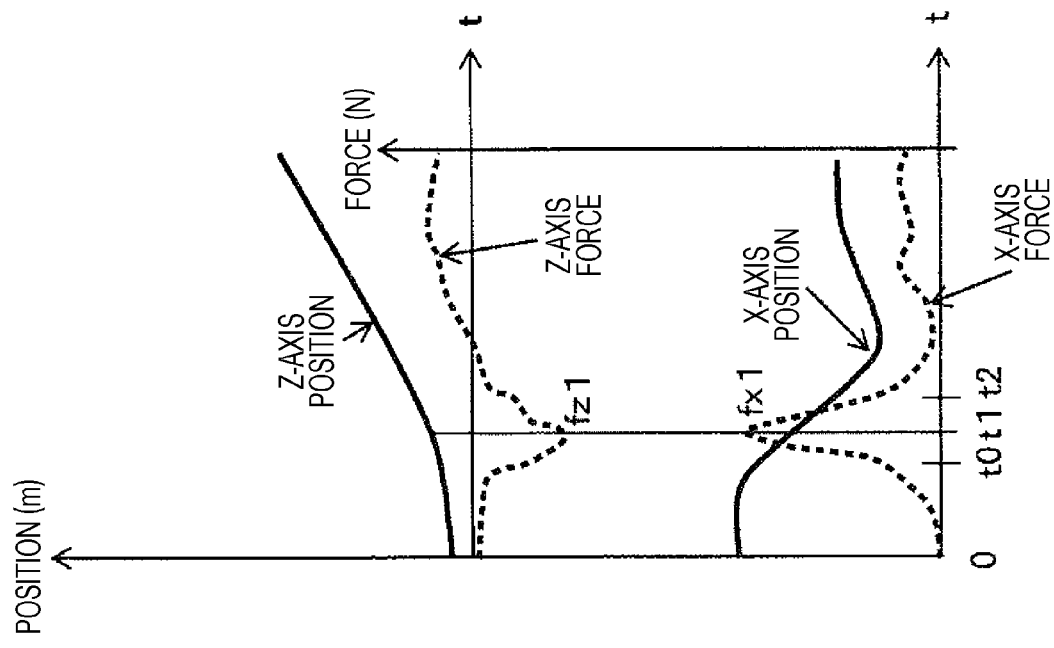
FIG. 12B is a graph representing motion information according to the second embodiment of the present disclosure.
Figure 12A:
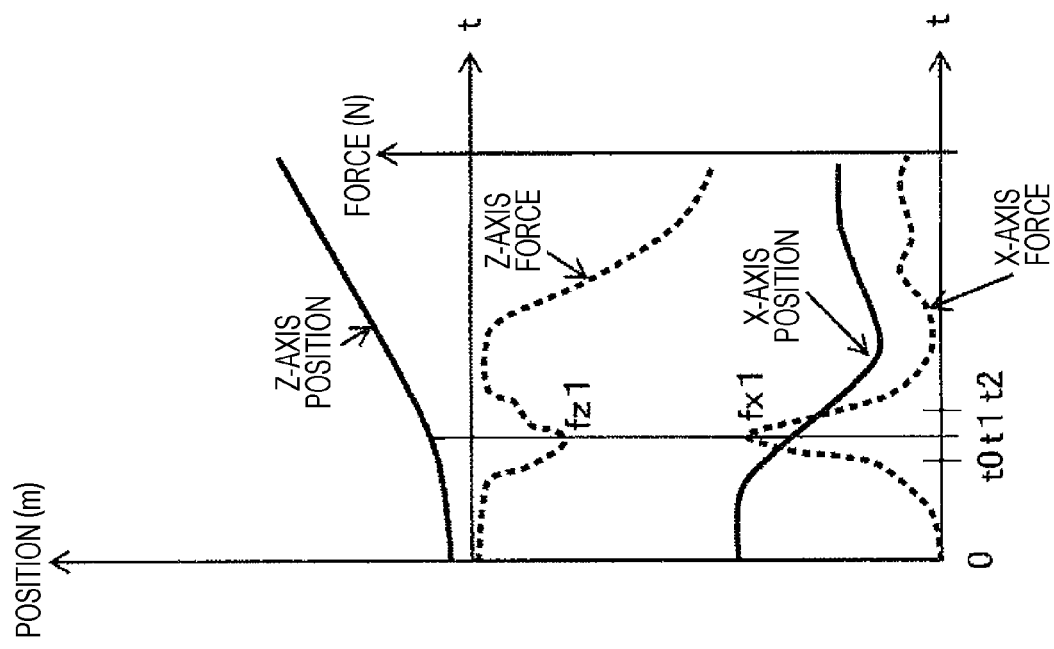
FIG. 12A is a graph representing motion information according to the second embodiment of the present disclosure.

Referring to FIG. 12A, the operation of generating the motion information will be described. FIG. 12A is a graph representing the motion information generated by the motion information generator 10. In FIG. 12A, the horizontal axis represents the time; one of the vertical axes represents x-axis position information and z-axis position information; and the other vertical axis represents x-direction force information and z-direction force information.

First, as illustrated in FIG. 7A, the care-receiver 7 starts a standing motion from a sitting position on the seat 5 (to be specific, see steps S201 to S203 described below, which are similar to steps S101 to S103 in the first embodiment). Next, the motion information generator 10 generates motion information with which the controller 12B independently controls the first motor 41 and the second motor 42 so that the arm mechanism 4 moves in the traveling direction (for example, the negative x-axis direction) as indicated by the left-up arrow in FIG. 7B (see step S205 described below). At the same time as generating this motion information, the motion information generator 10 generates motion information with which the controller 12B controls the backward-leaning motor 45 so that the holder support member 3b causes the back 7b of the care-receiver 7 to lean backward.

In FIG. 12A, the motion in step S205 is represented by the graphs in the period from time 0 to time t1. At time t1, the x-direction force and the z-direction force change considerably. This is because the time t1 is the timing at which the buttocks 7e start leaving the seat 5 due to the pulling motion in the traveling direction. As the buttocks 7e leave the seat 5, the x-direction force decreases and the z-direction force decreases.

The motion information generator 10 automatically detects the time t1. To be specific, from the time when the pulling motion is started, the motion information generator 10 calculates the difference of each of the x-direction force and the z-direction force on the basis of the x-direction force and the z-direction force at time t1 and time t0, which are detected by the force detector 17. (For example, this difference is the difference between a first force at a first time (for example, time t1) and a second force at a second time (for example, time t0, which is before the first time.) Next, also for time t2 and time t1, the motion information generator 10 calculates the difference of each of the x-direction force and the z-direction force. (For another example, the difference is the difference between a first force at a first time (for example, time t2) and a second force at a second time (for example, time t1), which is before the first time.) Likewise, the motion information generator 10 continues to calculate the difference of each of the x-direction force and the z-direction force between adjacent times.

Next, the motion information generator 10 detects the time when the sign of the difference changes. The motion information generator 10 determines that the time when the sign of the difference of the force detected by the force detector 17 changes is the time when the buttocks start leaving the seat. At this time, the motion information generator 10 generates motion information such that the arm mechanism 4 is moved upward. To be specific, time t1, which is immediately before the time (in this example, time t2) when the sign of the difference changes, is the turning point at which the force changes considerably. At the timing at which the motion information generator 10 detects the turning point, the motion information generator 10 generates the motion information so as to shift the z-axis position upward (to be specific, shift the z-axis position upward after time t2 in FIG. 12A). That is, from the time when the pulling motion is started to the time when the sign of the difference of each of the first force and the second force detected by the force detector 17 changes, the motion information generator 10 generates motion information such that the arm mechanism 4 pulls the connector 3c forward and upward; and after the sign of the difference of each of the first force and the second force has changed, the motion information generator 10 generates motion information such that the arm mechanism 4 pulls the connector 3c upward. Thus, as illustrated in FIG. 7C, the motion information generator 10 can generate motion information such that the arm mechanism 4 moves upward while moving forward. Moreover, as the backward-leaning motor 45 rotates the holder support member 3b of the holding mechanism 3g, the upper body of the care-receiver 7 can effectively lean backward and the care-receiver 7 can stand up easily. In this example, the turning point at which the x-direction force and the z-direction force change is detected. However, only one of the forces, such as the x-direction force, may be detected and used.

Next, on the basis of z-axis-force information, the motion information generator 10 determines a velocity when lifting the care-receiver 7 upward as illustrated in FIG. 7D.

To be specific, as in the period after time t1 of FIG. 12A, when the z-direction force is applied downward, the arm mechanism 4 lifts the care-receiver 7 at a predetermined velocity. However, if the z-direction force after time t1 is applied upward in the z-axis direction as illustrated in FIG. 12B, the motion information generator 10 generates motion information such that the arm mechanism 4 lifts the care-receiver 7 upward in the z-axis direction with an increasing velocity. Thus, if the lower body of the care-receiver 7 has a sufficient muscular strength and the care-receiver 7 can stand up with their own muscular strength, the lifting velocity is increased so as to follow the motion of the care-receiver 7. Therefore, the care-receiver 7 can stand up smoothly. In this example, the motion information generator 10 generates motion information such that the velocity increases until the force becomes zero. However, for example, it is possible to apply a load to the legs of the care-receiver 7 by causing the motion information generator 10 to generate motion information such that the arm mechanism 4 reduces the velocity until the force becomes an upward force in the z-axis direction. Therefore, the standing motion assist system can be also used for rehabilitation. FIG. 7E shows an end position, which is a predetermined position that has been determined beforehand in accordance with the height of the care-receiver 7. If the z-direction force after time t1 is applied downward in the z-axis direction, the lifting velocity in the z-axis direction is increased to a position where the z-direction force becomes an upward force. When the z-direction force becomes an upward force, the upward lifting velocity is not increased, and the care-receiver 7 is moved upward at a constant velocity. By doing so, if the muscular strength of the lower body has declined and the care-receiver 7 cannot stand up with their muscular strength, the velocity in the upward direction is increased and therefore the care-receiver 7 can stand up easily. Moreover, excessive assist can be avoided by stopping increasing the velocity when the direction of the force changes to the upward direction. Thus, the care-receiver 7 can be assisted by being provided with only a necessary amount of force, while using the muscular strength of their lower body.

The motion information generator 10 generates the motion information as described above and stores the motion information in the motion information database 8 via the database I/O unit 9.

The magnitude of a force detected by the force detector 17 may be displayed on a monitor (not shown) or the like attached to the arm mechanism 4 so that the care-receiver 7 can check the force applied to the arm mechanism 4. In this case, when a larger force is applied to the arm mechanism 4, it is implied that the care-receiver 7 has a smaller power in the lower body or the like. Therefore, for example, the care-receiver 7 can check the progress of rehabilitation. Moreover, by comparing the magnitude of the force with past data stored, the care-receiver 7 can check the cumulative effect of rehabilitation.

Controller 12B

The controller 12B independently moves the first motor 41 and the second motor 42 of the arm mechanism 4 and the backward-leaning motor 45 in accordance with the position information, the orientation information, and the force information, which are included in the motion information input from the database I/O unit 9. In addition, the controller 12B controls the front brakes 14c and the rear brakes 14d on the basis of instructions for applying/releasing the front brakes 14c and the rear brakes 14d, which are input through the input interface 6.

Hereinafter, motions of the robot system 1B, which are controlled by the controller 12B on the basis of the motion information generated by the motion information generator 10, will be described.

Referring the flowchart shown in FIG. 13, the motions of the arm mechanism 4 of the robot system 1B and corresponding motions of the care-receiver 7, which are illustrated in FIGS. 7A to 7E, will be described.

As illustrated in FIG. 7A, the care-receiver 7 sits on the seat 5, such as a bed, placed on the floor 13. Next, a caregiver, for example, moves the robot 20B of the robot system 1B to a position in front of the care-receiver 7, who is sitting on the seat 5.

Figure 13:
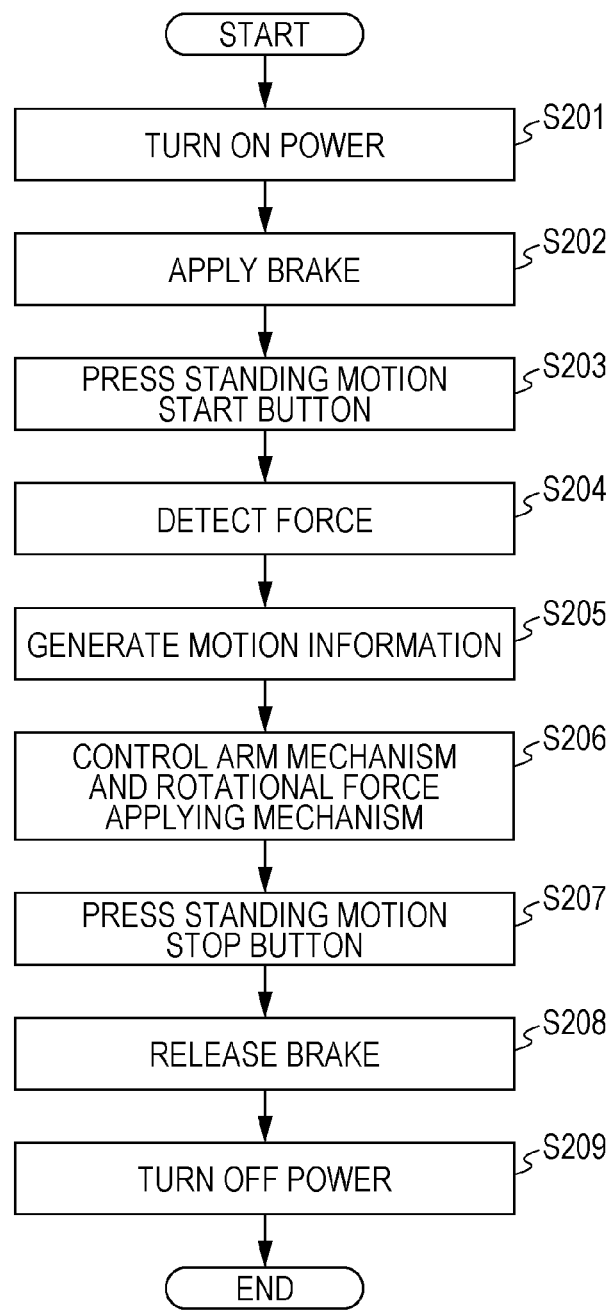
FIG. 13 is a flowchart showing motion control that is performed by a controller according to the second embodiment of the present disclosure.

In step S201 of FIG. 13, the care-receiver 7 turns on the power of the robot system 1B by using the input interface 6 of the robot 20B.

In step S202, the care-receiver 7 applies the front brakes 14c and the rear brakes 14d by using the input interface 6, and the controller 12B brakes the front wheels 14a and the rear wheels 14b of the walking mechanism 14 so that the wheels 14a and 14b will not rotate.

Next, the care-receiver 7 attaches the holding mechanism 3g of the care belt 3, which is connected to the arm mechanism 4, to their body and grips the handle 15 with both hands.

In step S203, the care-receiver 7 presses the standing motion start button of the input interface 6 to activate the robot system 1B. In this example, the robot system 1B moves only while the standing motion start button is being pressed, and the robot system 1B stops moving when the standing motion start button is released. In the following steps S204 to S206, the control device 11B of the robot system 1B independently controls the first driver 4a and the second driver 4b of the arm mechanism 4, and the backward-leaning motor 45. By doing so, the robot system 1B assists the care-receiver 7 in lifting the buttocks 7e off the seat 5 as shown in FIG. 7B and in standing up from a sitting position shown in FIG. 7A to a standing position shown in FIG. 7C.

In step S204, the force detector 17 detects a force that the care-receiver 7 applies to the arm mechanism 4.

In step S205, the motion information generator 10 generates the motion information on the basis of the force detected by the force detector 17, the position information of the arm mechanism 4, and the orientation information of the holder support member 3b; and stores the motion information in the motion information database 8 via the database I/O unit 9.

In step S206, the controller 12B acquires the motion information from the database I/O unit 9; and the controller 12B independently controls the first motor 41, the second motor 42, and the backward-leaning motor 45 so that the arm mechanism 4 moves in accordance with the motion information acquired from the database I/O unit 9.

For example, the controller 12B controls the arm mechanism 4 and the rotational force applying mechanism 30 as follows: the arm mechanism 4 moves forward and upward as illustrated in FIG. 7B from a state in which the care-receiver 7 is in a sitting position shown in FIG. 7A; and at the same time, the rotational force applying mechanism 30 rotates the holder support member 3b about a rotation axis extending through both armpits 7g of the care-receiver 7 so that a front part of the holder support member 3b moves upward and a rear part of the holder support member 3b moves downward, thereby causing the back 7b of the care-receiver 7 to lean backward. As a result, as illustrated in FIG. 7B, the arm mechanism 4 causes the pelvis of the care-receiver 7 to tilt forward as indicated by the counterclockwise dotted-line arrow B by pulling the holding mechanism 3g forward and upward. Moreover, the rotational force applying mechanism 30 causes the upper body of the care-receiver 7 to lean backward as indicated by the clockwise dotted-line arrow A by rotating the holder support member 3b so that a front part of the holder support member 3b moves upward and a rear part of the holder support member 3b moves downward about the rotation axis. Thus, the care-receiver 7 can easily stand up from the seat 5, because the arm mechanism 4 causes the pelvis of the care-receiver 7 to tilt forward to assist the care-receiver 7 in lifting their buttocks off the seat 5, and, at the same time, the rotational force applying mechanism 30 causes the upper body of the care-receiver 7 to lean backward. By causing the back of the care-receiver 7 to lean backward, the care-receiver 7 can smoothly shift from a sitting position to a standing position without leaning forward to a large degree.

Next, as illustrated in FIG. 7C, when the buttocks 7e of the care-receiver 7 leave the seat 5 (that is, at the end of the first state, that is, in the second state from the time when the first state ends to the time when the care-receiver 7 assumes a standing position), the controller 12B controls the arm mechanism 4 so that the arm mechanism 4 moves upward as indicated by the up arrow FIG. 7D.

In the second embodiment, the motion information generator 10 generates the motion information on the basis of a force detected by the force detector 17, the position information of the arm mechanism 4, and the orientation information of the holder support member 3b. Therefore, for example, the motion information generator 10 can generate the motion information flexibly in accordance with the difference in the height of the care-receiver 7, the difference in the forward leaning velocity of the care-receiver 7, or the like.

Figure 14:
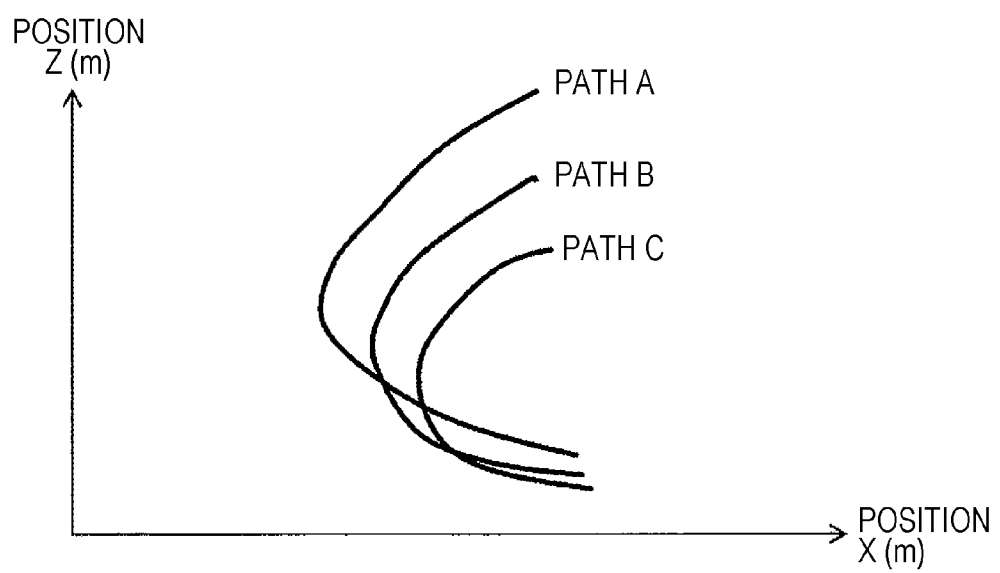
FIG. 14 is a graph representing the difference in the path of a connector connected to an arm mechanism according to the second embodiment of the present disclosure, which occurs due to the difference in the height of a care-receiver.

FIG. 14 illustrates an example of the difference in the path of the connector 3c, which is connected to the arm mechanism 4, due to the difference in the height of the care-receiver 7. In FIG. 14, the vertical axis (z-axis) extends in the up-down direction of the robot system 1B, and the horizontal axis (s-axis) extends in the direction in which the robot system 1B travels (for example, the front-back direction). The path A shown in FIG. 14 is the path of the connector 3c when the height of the care-receiver 7 is 180 cm. The path B shown in FIG. 14 is the path of the connector 3c when the height of the care-receiver 7 is 167 cm. The path C shown in FIG. 14 is the path of the connector 3c when the height of the care-receiver 7 is 155 cm. The greater the height of the care-receiver 7, the higher the path; and the smaller the height, the lower the path. The paths shown in FIG. 14 are C-shaped. A lower part of each of the paths, which is substantially parallel to the x-axis, represents an example of a forward-and-upward pulling motion with which the connector 3c is pulled forward for a very short time and subsequently lifted diagonally upward.

As described above, due to the upward motion of the arm mechanism 4, the care-receiver 7 is assisted in moving upward and finishes the standing motion as illustrated in FIG. 7E. At this time, the care-receiver 7 is in a standing position.

In step S207, the care-receiver 7 releases the button of the input interface 6 to stop the standing-motion control performed by the controller 12B, that is, to stop the operation of the arm mechanism 4 and the rotational force applying mechanism 30. Note that, even before step S207, the care-receiver 7 can stop the standing-motion control operation performed by the controller 12B and the operation of the arm mechanism 4 by releasing the button of the input interface 6.

In step S208, the care-receiver 7 releases the front brakes 14c and the rear brakes 14d by using the input interface 6.

In step S209, the care-receiver 7 turns off the power by using the input interface 6. The care-receiver 7, who has assumed a standing position as illustrated in FIG. 7E, can use the walking mechanism 14 as a walker, which assists the care-receiver 7 in walking, by applying a forward force to the walking mechanism 14 and thereby rotating the front wheels 14a and the rear wheels 14b.

Advantageous Effects of Second Embodiment

The motion information generator 10 generates motion information of the arm mechanism 4 on the basis of position information and orientation information stored in the motion information database 8 and a force detected by the force detector 17 and stored in the motion information database 8. Therefore, for example, the motion information generator 10 can generate the motion information flexibly in accordance with the difference in the height of the care-receiver 7, the difference in the forward leaning velocity of the care-receiver 7, or the like. As a result, in the initial stage of a standing motion (that is, in the first state in which the care-receiver 7, who has been in a sitting position, lifts the buttocks 7e off the seat 5), the robot system 1 can reduce the degree of forward leaning of the care-receiver 7 and can assist the care-receiver 7 in performing a standing motion similar to that of an able-bodied adult person.

Third Embodiment

Figure 15A:
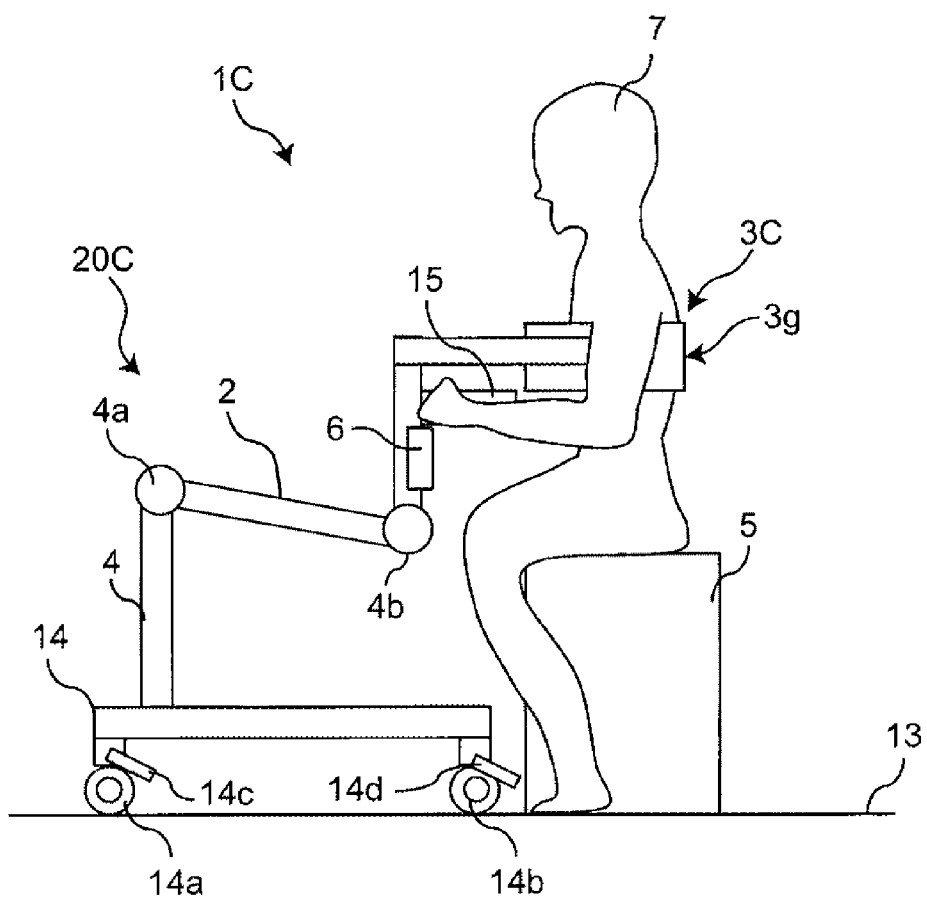
FIG. 15A is a schematic side view illustrating a robot system according to a third embodiment of the present disclosure.
Figure 15B:
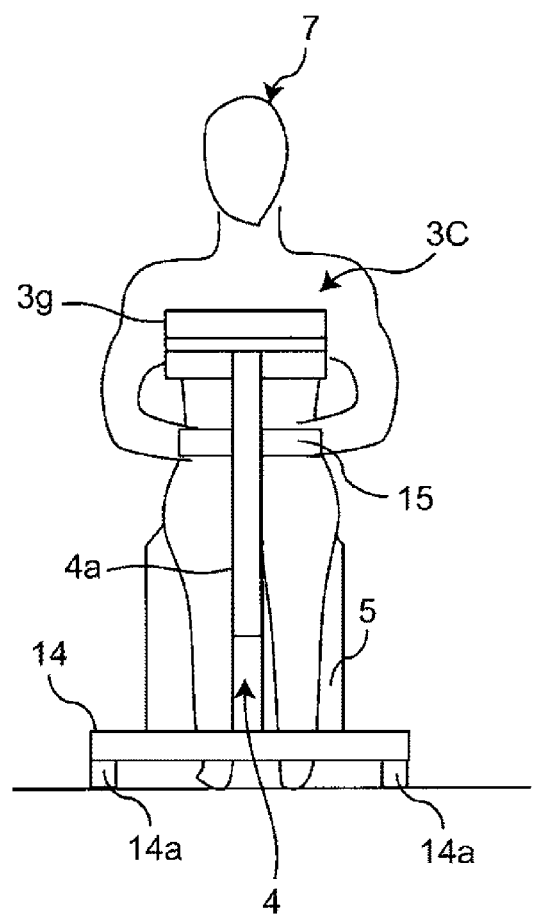
FIG. 15B is a schematic front view illustrating a robot system according to the third embodiment of the present disclosure.

FIGS. 15A and 15B are respectively a side view and a front view of a robot system 1C that is an example of a standing motion assist system (that is, a standing motion assist apparatus) according to a third embodiment of the present disclosure, illustrating an exemplary operation of a robot 20C that assists a care-receiver 7 in moving from a sitting position to a standing position. FIG. 16 is a block diagram of the robot system 1C according to the third embodiment.

The robot system 1C according to the third embodiment assists the care-receiver 7 in leaning backward by controlling air pressure instead of by controlling a motor. That is, the robot system 1C includes a rotational force applying mechanism 30C, instead of the rotational force applying mechanism 30 including the backward-leaning motor 45 and the backward-leaning encoder 46. The rotational force applying mechanism 30C includes at least two inflatable chambers. For example, the rotational force applying mechanism 30C includes first to third inflatable chambers 36, 37, and 38; three air pressure valves V1, V2, and V3; and an air pressure supply source 35, such as a compressor. This structure is the major difference from the first and second embodiments. Hereinafter, the difference will be described in detail.

Holding Mechanism 3g

Figure 17A:
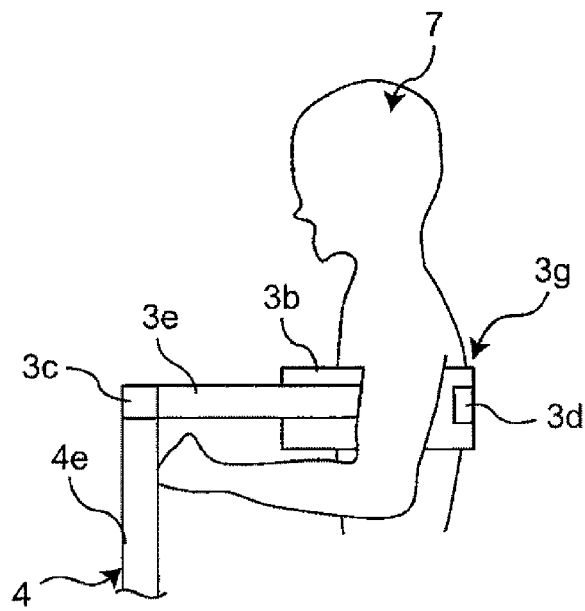
FIG. 17A is a side view illustrating a holding mechanism according to the third embodiment of the present disclosure.
Figure 17B:
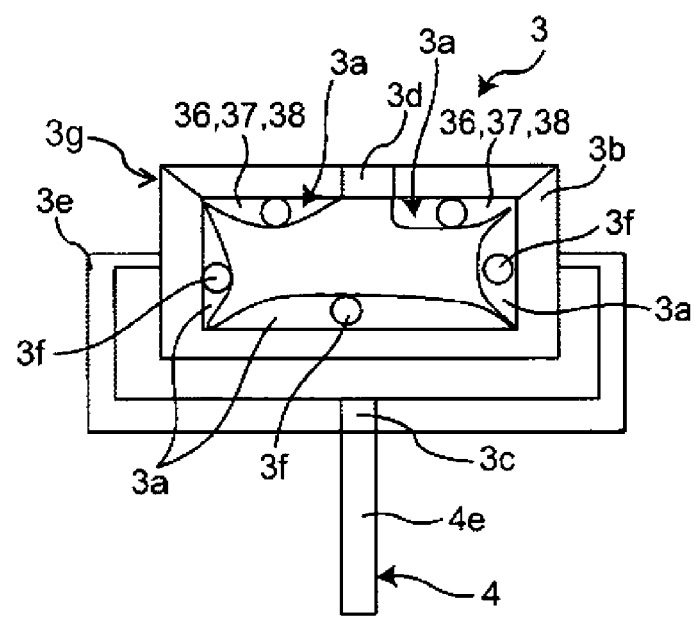
FIG. 17B is a side view illustrating the holding mechanism according to the third embodiment of the present disclosure.
Figure 17C:
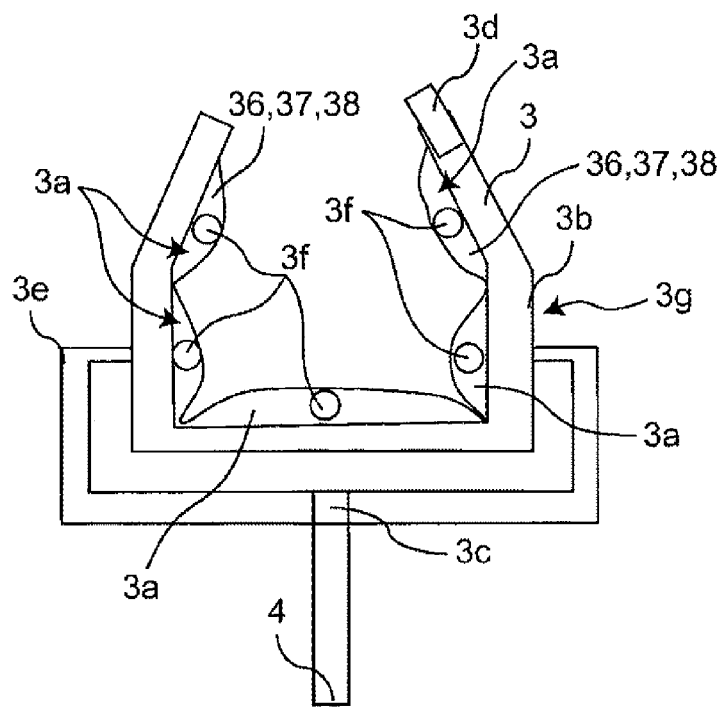
FIG. 17C is a plan view illustrating the holding mechanism according to the third embodiment of the present disclosure.
Figure 17D:
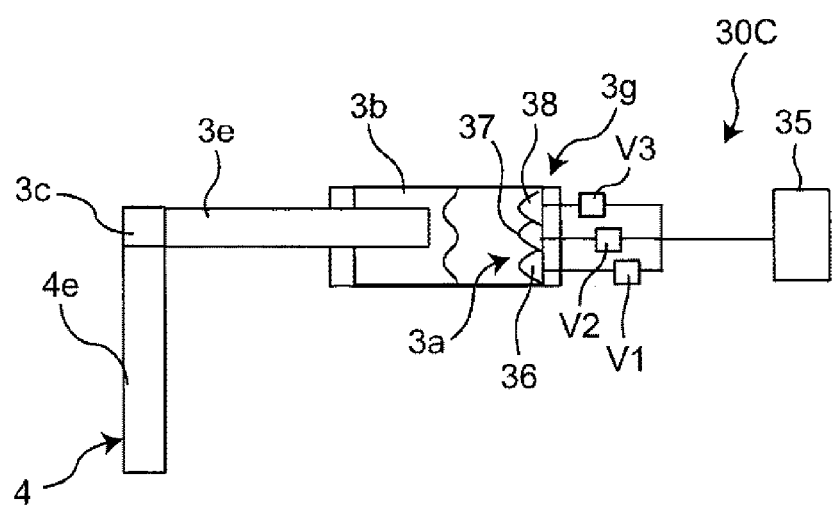
FIG. 17D is a side view illustrating the structure of the holding mechanism according to the third embodiment of the present disclosure.

FIGS. 17A to 17D illustrate an example of the holding mechanism 3g. FIG. 17A is a side view illustrating the care-receiver 7 to whom the holding mechanism 3g is attached. FIGS. 17B and 17C are top views respectively illustrating the holding mechanism 3g when it is attached to the care-receiver 7 and the holding mechanism 3g when it is being attached to/detached from the care-receiver 7. FIG. 17D is a partially sectional side view illustrating the holding mechanism 3g when it is attached to the care-receiver 7.

The first to third inflatable chambers 36, 37, and 38, which are included in the holder 3a, are arranged in order from an upper part to a lower part of an inner surface of the holder support member 3b of the holding mechanism 3g. The first to third inflatable chambers 36, 37, and 38 are each an air bag that can be inflated with a gas, such as air. In this example, the first to third inflatable chambers 36, 37, and 38 are included in the holder 3a. However, they may be independent from the holder 3a.

As in the first embodiment, the holder 3a is fixed to and supported by the inner surface of the holder support member 3b. The holder 3a includes the first to third inflatable chambers 36, 37, and 38, which are arranged on the inner surface of a rear part of the holder support member 3b in order from an upper part toward a lower part of the inner surface. That is, as illustrated in FIG. 17D, the first inflatable chamber 36 is located at the lowest position. The second inflatable chamber 37 is disposed above the first inflatable chamber 36. The third inflatable chamber 38 is disposed above the second inflatable chamber 37. For example, the first to third inflatable chambers 36, 37, and 38 are hermetically closed spaces that are independent from each other.

The first to third inflatable chambers 36, 37, and 38 need not be hermetically closed independent spaces and may be spaces that are connected to each other. For example, constricted portions, which are narrower than the inflatable chambers, may be disposed between adjacent inflatable chambers. In this case, after the first inflatable chamber 36 has been inflated to a predetermined air pressure, the second inflatable chamber 37 is inflated through one of the constricted portion until the pressure inside the second inflatable chamber 37 increases to a predetermined air pressure; and subsequently the third inflatable chamber 38 is inflated through the other constricted portion.

Rotational Force Applying Mechanism 30C

The rotational force applying mechanism 30C at least includes the first inflatable chamber 36 and the second inflatable chamber 37, which are connected to the holding mechanism 3g, which are located at the back 7b of the care-receiver 7, which independently inflate when a gas is independently supplied thereto, and which are arranged in the up-down direction. For example, the rotational force applying mechanism 30C includes the first to third inflatable chambers 36, 37, and 38 of the holder 3a; the first to third air pressure valves V1, V2, and V3 connected to the first to third inflatable chambers 36, 37, and 38; and the air pressure supply source 35 connected to the first to third air pressure valves V1, V2, and V3. The rotational force applying mechanism 30C is a mechanism that applies a rotational force so as to rotate the back 7b of the care-receiver 7 relative to the holder support member 3b by inflating the first to third inflatable chambers 36, 37, and 38 in order from the lowest to the highest of these.

To be specific, the first to third inflatable chambers 36, 37, and 38 are independent from each other and are connected to the air pressure supply source 35 via the first to third air pressure valves V1, V2, and V3. The first to third air pressure valves V1, V2, and V3 are independently controlled by a controller 12C so as to be independently opened or closed. Thus, when the controller 12C performs control so as to independently open or close the first to third air pressure valves V1, V2, and V3, the first to third inflatable chambers 36, 37, and 38 independently inflate and can press the back of the care-receiver 7.

Figure 17E:
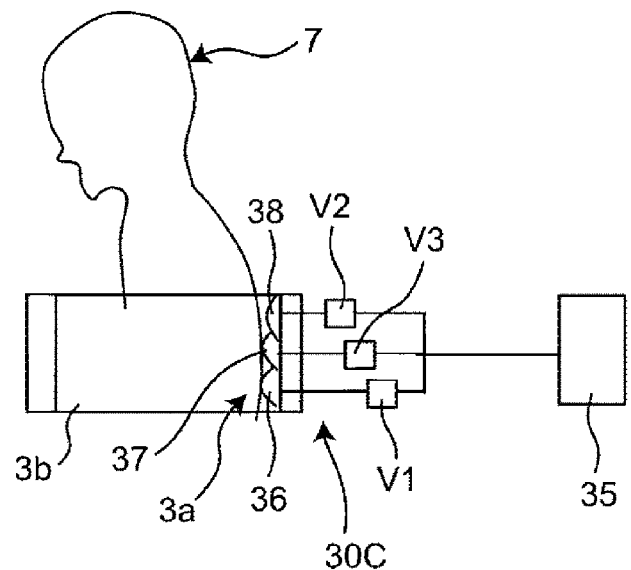
FIG. 17E illustrates the holding mechanism according to the third embodiment of the present disclosure when only a first inflatable chamber is inflated.
Figure 17F:
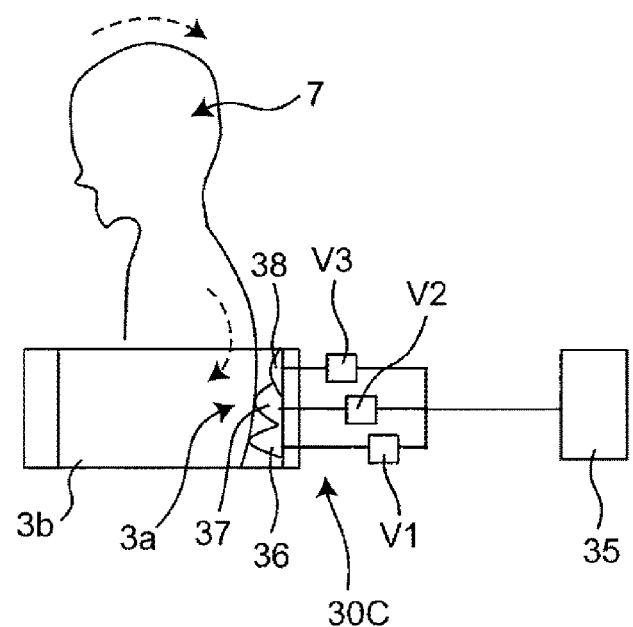
FIG. 17F illustrates the holding mechanism according to the third embodiment of the present disclosure when the first inflatable chamber and a second inflatable chamber are inflated.
Figure 17G:
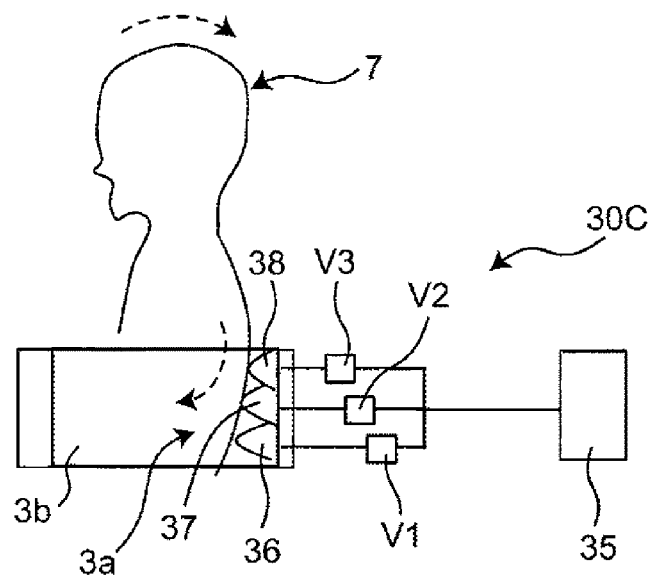
FIG. 17G illustrates the holding mechanism according to the third embodiment of the present disclosure when the first to third inflatable chambers are inflated.

Referring to FIGS. 17E to 17G, further details will be described.

First, in FIG. 17E, under the control by the controller 12C, only the first air pressure valve V1 of the first inflatable chamber 36, which is located at the lowest position, is opened so that compressed air is supplied from the air pressure supply source 35 only to the first inflatable chamber 36. Thus, only a lower part of the back 7b of the care-receiver 7 is pressed. In this state, the care-receiver 7 is still leaning forward slightly.

Next, as illustrated in FIG. 17F, the controller 12C controls the rotational force applying mechanism 30C as follows: compressed air is supplied from the air pressure supply source 35 to the first inflatable chamber 36, which is located at the lower position; and when the pressure in the first inflatable chamber 36 reaches a predetermined first air pressure, while continuing to supply air to maintain the first air pressure, the second air pressure valve V2 of the second inflatable chamber 37, which is located immediately above the first inflatable chamber 36, is opened so that compressed air is supplied from the air pressure supply source 35 to the second inflatable chamber 37 as well as to the first inflatable chamber 36. Thus, the lower part of the back 7b of the care-receiver 7 and a middle part of the back 7b, which is immediately above the lower part, are pressed. As a result, the degree of forward leaning of the care-receiver 7 is slightly reduced.

Next, as illustrated in FIG. 17G, the controller 12C controls the rotational force applying mechanism 30C as follows: compressed air is supplied from the air pressure supply source 35 to the second inflatable chamber 37; and when the pressure in the second inflatable chamber 37 reaches a predetermined second air pressure, while continuing to supply compressed air to maintain the first air pressure and the second air pressure, the third air pressure valve V3 of the third inflatable chamber 38, which is directly above the second inflatable chamber 37, is opened so that compressed air is supplied from the air pressure supply source 35 to the third inflatable chamber 38 until the pressure becomes a predetermined third air pressure. Thus, the lower part of the back 7b of the care-receiver 7; the middle part of the back 7b, which is immediately above the lower part; and an upper part of the back 7b, which is above the middle part, are pressed. As a result, the degree of forward leaning of the care-receiver 7 is further reduced than in FIG. 17F and the care-receiver 7 leans backward.

As described above, when the controller 12C performs control so as to open the first to third air pressure valves V1, V2, and V3 in order, the first to third inflatable chambers 36, 37, and 38 are inflated in order. Therefore, because a part of the holder 3a that presses the back 7b of the care-receiver 7 moves upward, it is possible to cause the upper body of the care-receiver 7 to leans backward as indicated by the clockwise dotted-line arrow A in FIG. 7B.

Thus, when the controller 12C performs control so that the arm mechanism 4 pulls the holding mechanism 3g forward and upward via the connector 3c (see the counterclockwise dotted-line arrow B in FIG. 7B) to cause the pelvis of the care-receiver 7 to tilt forward, the controller 12C also performs control so as to open or close the first to third air pressure valves V1, V2, and V3 to increase the air pressures in the first to third inflatable chambers 36, 37, and 38 of the holder 3a to predetermined air pressures in order from the lowest to the highest of these. Accordingly, it is possible to cause the upper body of the care-receiver 7 to lean backward as indicated by the clockwise dotted-line arrow A in FIG. 7B.

Motion Information Database 8C

The controller 12C is activated on the basis of instructions from the timer 16. Then, the controller 12C and the database I/O unit 9 generate the position information of the arm mechanism 4 and the orientation information of the rotational force applying mechanism 30C (that is, the holder 3a) at predetermined intervals (for example, every 1 msec) in accordance with instructions from the timer 16. To be specific, the position information is converted from the rotation angle information from each of the first encoder 43 and the second encoder 44. The orientation information is, for example, the air pressures in the first to third inflatable chambers 36, 37, and 38. In the third embodiment, the position information and the orientation information, which are generated as described above, and the time are output to the motion information database 8C via the database I/O unit 9 as motion information and stored in the motion information database 8C as motion information. In the third embodiment, the motion information is generated beforehand by using the input interface 6 and the like and stored.

FIG. 18 shows an example of the contents of the information stored in the motion information database 8C.

(1) The column "TIME" represents information about the time when the arm mechanism 4 and the rotational force applying mechanism 30C are moving. In the third embodiment, the time is measured in milliseconds (msec).

(2) The column "POSITION" represents the position information of the arm mechanism 4, which is converted from the angle information detected by an encoder or the like (not shown). To be specific, the "position" is represented by xy coordinates, where the x-axis is an axis extending in the direction in which the robot system 1C travels (for example, the front-back direction) and z-axis is the vertical axis. In the third embodiment, the position is measured in meter (m).

(3) The column "AIR PRESSURE" represents the air pressure in each of the first to third inflatable chambers 36, 37, and 38 of the holder 3a. Information about the air pressure in each of the first to third inflatable chambers 36, 37, and 38, which are illustrated in FIGS. 17E to 17G, is stored. In the first embodiment, the air pressure is measured in kilopascal (kPa).

Controller 12C

The controller 12C controls the rotational force applying mechanism 30C and the arm mechanism 4 so that, while the arm mechanism 4 is pulling the connector 3c forward and upward, the rotational force applying mechanism 30C supplies the gas to the first inflatable chamber 36 and subsequently supplies the gas to the second inflatable chamber 37, which is located above the first inflatable chamber 36. For example, the controller 12C independently moves the first motor 41 and the second motor 42 of the arm mechanism 4 in accordance with the motion information input from the database I/O unit 9. Moreover, the controller 12C controls the air pressures in the first to third inflatable chambers 36, 37, and 38 by opening or closing the three air pressure valves V1, V2, and V3 in accordance with the air pressure data stored in the motion information that is input from the database I/O unit 9. In addition, the controller 12C controls the front brakes 14c and the rear brakes 14d on the basis of instructions for applying/releasing the front brakes 14c and the rear brakes 14d, which are input through the input interface 6.

Hereinafter, motions of the robot system 1C controlled by the controller 12C will be described.

Referring the flowchart shown in FIG. 20, the motions of the arm mechanism 4 of the robot system 1 and corresponding motions of the care-receiver 7, which are illustrated in FIGS. 19A to 19E, will be described.

Figure 19A:
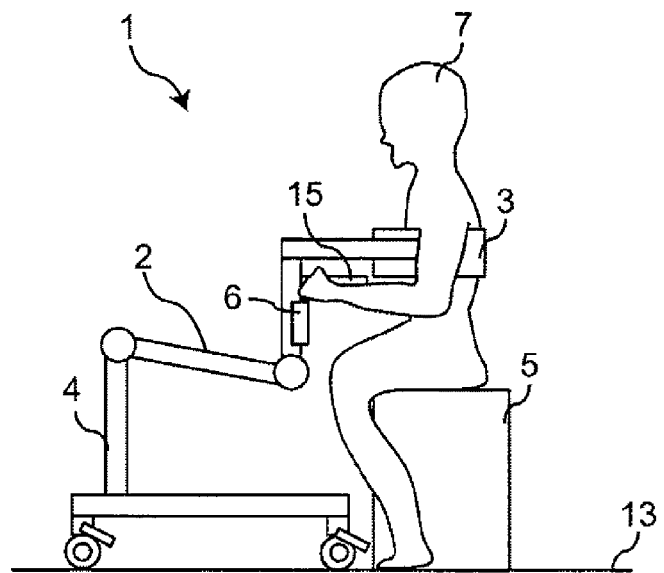
FIG. 19A illustrates a motion of the robot system according to the third embodiment of the present disclosure.

First, as illustrated in FIG. 19A, the care-receiver 7 sits on the seat 5, such as a bed, a chair, or a toilet seat, placed on the floor 13. Next, a caregiver, for example, moves the robot 20C of the robot system 1C to a position in front of the care-receiver 7, who is sitting on the seat 5.

Figure 20:
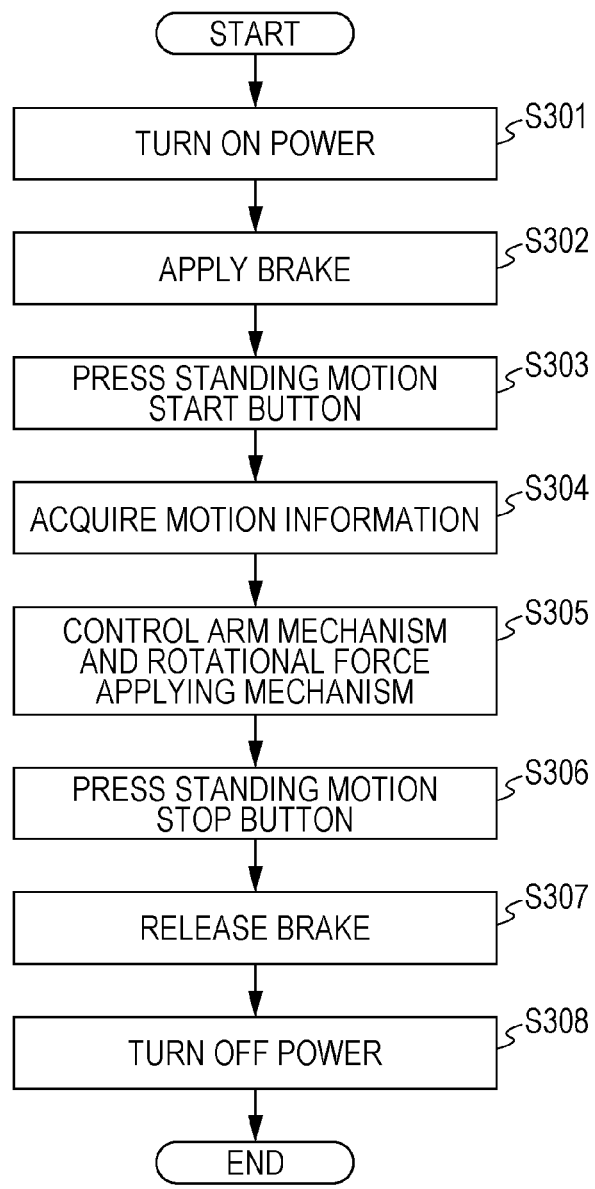
FIG. 20 is a flowchart showing motion control that is performed by a controller according to the third embodiment of the present disclosure.

In step S301 of FIG. 20, the care-receiver 7 turns on the power of the robot system 1C by using the input interface 6 of the robot 20C.

In step S302, the care-receiver 7 applies the front brakes 14c and the rear brakes 14d by using the input interface 6, and the controller 12C brakes the front wheels 14a and the rear wheels 14b of the walking mechanism 14 so that the wheels 14a and 14b will not rotate. By doing so, when the arm mechanism 4 pulls the holding mechanism 3g via the connector 3c, the walking mechanism 14 does not move, and a force from the arm mechanism 4 can be transmitted to the holding mechanism 3g via the connector 3c without fail.

Next, the care-receiver 7 attaches the holding mechanism 3g of the care belt 3, which is connected to the arm mechanism 4, to their body and grips the handle 15 with both hands.

Figure 19B:
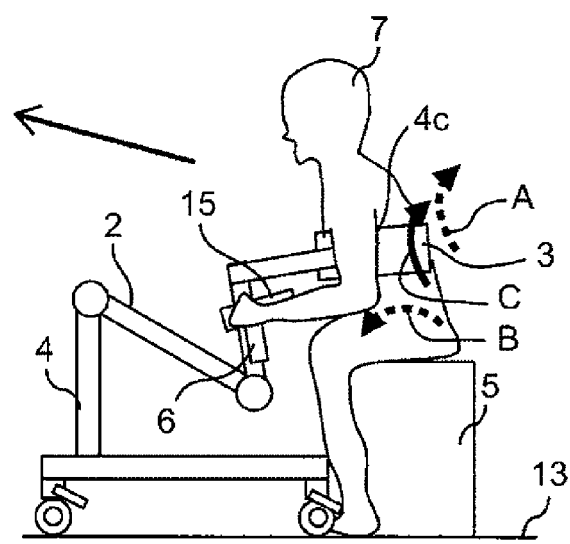
FIG. 19B illustrates a motion of the robot system according to the third embodiment of the present disclosure.

In step S303, the care-receiver 7 presses the standing motion start button of the input interface 6 to activate the robot system 1C. In this example, the robot system 1C moves only while the standing motion start button is being pressed, and the robot system 1C stops moving when the standing motion start button is released. In the following steps S304 to S306, a control device 11C of the robot system 1C independently controls the first driver 4a and the second driver 4b of the arm mechanism 4, and the control device 11C performs control so as to open or close the first to third air pressure valves V1, V2, and V3 of the rotational force applying mechanism 30C. Thus, the robot system 1C assists the care-receiver 7 in lifting the buttocks 7e off the seat 5 as shown in FIG. 19B and in standing up from a sitting position shown in FIG. 19A to a standing position shown in FIG. 19C.

In step S304, the controller 12C acquires the motion information from the database I/O unit 9.

In step S305, the controller 12C independently controls the first motor 41 and the second motor 42 so that the arm mechanism 4 moves in accordance with the position information of the motion information acquired from the database I/O unit 9. In addition, the controller 12C controls the air pressure in the holder 3a, that is, performs control so as to open or close the first to third air pressure valves V1, V2, and V3 in accordance with air pressure information of the motion information from the database I/O unit 9. For example, the controller 12C controls the arm mechanism 4 and the rotational force applying mechanism 30C as follows: the arm mechanism 4 moves forward and upward as illustrated in FIG. 19B from a state in which the care-receiver 7 is in a sitting position shown in FIG. 19A; and at the same time, the first to third air pressure valves V1, V2, and V3 of the holder 3a of the rotational force applying mechanism 30C (for example, the first to third inflatable chambers 36, 37, and 38) are opened or closed. To be specific, the controller 12C performs controls so as to open or close the first to third air pressure valves V1, V2, and V3 so that the air pressures in the first to third inflatable chambers 36, 37, and 38 of the holder 3a, which are disposed from below at the back 7b of the care-receiver 7 illustrated in FIG. 17D, are increased in order of the first inflatable chamber 36, the second inflatable chamber 37, and the third inflatable chamber 38. To be specific, the controller 12C performs control as follows: the air pressure in the first inflatable chamber 36 to the first air pressure by opening the first air pressure valve V1; next, the air pressure in the second inflatable chamber 37 is increased to the second air pressure by opening the second air pressure valve V2 while maintaining the air pressure in the first inflatable chamber 36 at the first air pressure; and next, the air pressure in the third inflatable chamber 38 is increased to the third air pressure by opening the third air pressure valve V3 while maintaining the air pressure in the first inflatable chamber 36 at the first air pressure and the air pressure in the second inflatable chamber 37 at the second air pressure. As a result, as illustrated in FIG. 19B, the arm mechanism 4 causes the pelvis of the care-receiver 7 to tilt forward as indicated by the counterclockwise dotted-line arrow B by pulling the holding mechanism 3g via the connector 3c forward and upward; and the rotational force applying mechanism 30C causes the upper body of the care-receiver 7 to lean backward as indicated by a clockwise dotted-line arrow A by opening or closing the first to third air pressure valves V1, V2, and V3 to make the air pressures in the first to third inflatable chambers 36, 37, and 38 of the holder 3a increase in order from below and to press the back 7b of the care-receiver 7 in order from a lower part to an upper part. In this way, the arm mechanism 4 causes the pelvis of the care-receiver 7 to tilt forward to assist the care-receiver 7 in lifting the buttocks 7e off the seat 5. At the same time, the rotational force applying mechanism 30C causes the upper body of the care-receiver 7 to lean backward as indicated by a clockwise solid line arrow C in FIG. 19B. Accordingly, the care-receiver 7 can easily stand up from the seat 5. By causing the back of the care-receiver 7 to lean backward, the care-receiver 7 can smoothly shift from a sitting position to a standing position without leaning forward to a large degree.

Figure 19C:
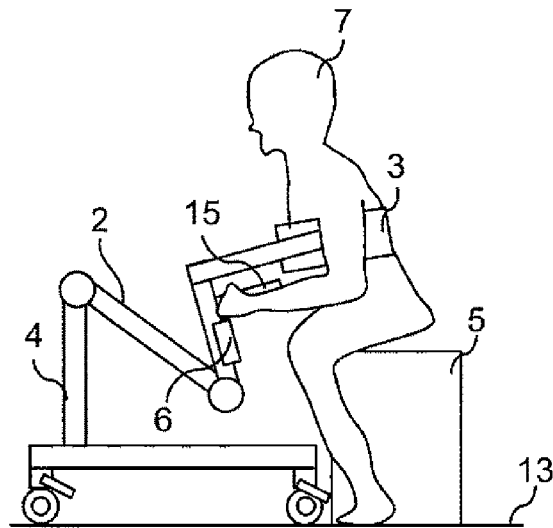
FIG. 19C illustrates a motion of the robot system according to the third embodiment of the present disclosure.
Figure 19D:
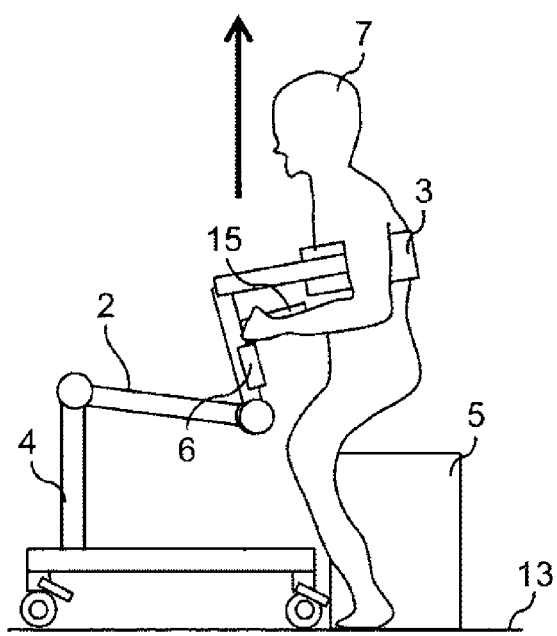
FIG. 19D illustrates a motion of the robot system according to the third embodiment of the present disclosure.
Figure 19E:
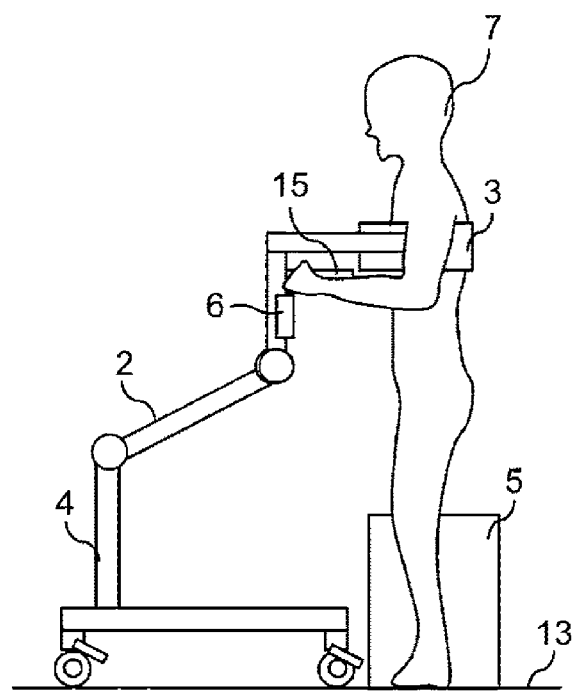
FIG. 19E illustrates a motion of the robot system according to the third embodiment of the present disclosure.

Next, as illustrated in FIG. 19C, when the buttocks 7e of the care-receiver 7 leave the seat 5 (that is, at the end of the first state, that is, in the second state from the time when the first state ends to the time when the care-receiver 7 assumes a standing position), the controller 12C controls the arm mechanism 4 so that the arm mechanism 4 moves upward as indicated by an up arrow FIG. 19D. In doing so, the first to third air pressure valves V1, V2, and V3 may be opened so as to slightly reduce the air pressures in the first to third inflatable chambers 36, 37, and 38, which have been increased in step S305. By performing control in this way, the care-receiver 7 can be prevented from feeling a sensation of being pressed too strongly by the holder 3a. Due to the upward motion of the arm mechanism 4, the care-receiver 7 is assisted in moving upward and finishes the standing motion as illustrated in FIG. 19E. At this time, the care-receiver 7 is in a standing position.

In step S306, the care-receiver 7 releases the button of the input interface 6 to stop the standing-motion control performed by the controller 12C, that is, to stop the operation of the arm mechanism 4 and the opening/closing operations of the first to third air pressure valves V1, V2, and V3 of the rotational force applying mechanism 30C. Note that, even before step S306, the care-receiver 7 can stop the operations of the arm mechanism 4 and the rotational force applying mechanism 30C, which are controlled by the controller 12C, by releasing the button of the input interface 6.

In step S307, the care-receiver 7 releases the front brakes 14c and the rear brakes 14d by using the input interface 6.

In step S308, the care-receiver 7 turns off the power by using the input interface 6. The care-receiver 7, who has assumed a standing position as illustrated in FIG. 7E, can use the walking mechanism 14 as a walker, which assists the care-receiver 7 in walking, by applying a forward force to the walking mechanism 14 and thereby rotating the front wheels 14a and the rear wheels 14b.

Advantageous Effects of Third Embodiment

The third embodiment is structured so that, while causing the pelvis of the care-receiver 7 to tilt forward by pulling the holding mechanism 3g forward and upward by using the arm mechanism 4, the first to third air pressure valves V1, V2, and V3 of the rotational force applying mechanism 30C are opened or closed so as to increase the air pressures in the first to third inflatable chambers 36, 37, and 38 of the holder 3a in order from a lower part to an upper part on the care-receiver 7. As a result, the upper body of the care-receiver 7 can be caused to lean backward, and thereby the care-receiver 7 can smoothly shift their position from a sitting position to a standing position without leaning forward to a large degree.

Modifications of First to Third Embodiments

In the first and second embodiments, the robot systems 1, 1B, and 10 each include the walking mechanism 14 including the arm mechanism 4. However, the arm mechanism 4 may be included in the seat 5, which may be a bed side rail, a toilet seat, or a wheelchair.

In the first and second embodiments, the holder 3a of the holding mechanism 3g is an air bag. However, the holder 3a may be made of any member that can hold the care-receiver 7, such as a member including urethane foam.

In the first and second embodiments, the holding mechanism 3g includes the backward-leaning motor 45. However, the backward-leaning motor 45 may be omitted, and the holding mechanism 3g may be rotated by the first motor 41 and the second motor 42.

Heretofore, the first to third embodiments and their modifications have been described. However, the present disclosure is not limited to the first to third embodiments and the modifications. The present disclosure includes the following cases.

In each embodiment, any part of the control devices 11, 11B, and 11C may be implemented in software. For example, the software may be stored in a computer-readable recording medium (such as a hard disk) as a computer program including the control steps in each of the embodiments described in the present specification. In this case, the steps can be performed by reading the computer program into a temporary storage device (such as a semiconductor memory) of a computer and by causing a CPU to execute the computer program.

To be more specific, some or all parts of each of the control devices may be a computer system including various devices, such as a microprocessor, a ROM, a RAM, a hard disk unit, a display unit, a keyboard, and a mouse. The RAM or the hard disk unit stores a computer program. The microprocessor executes the computer program to cause the devices to perform their functions. The computer program includes a plurality of instruction codes for causing the computer to perform a predetermined function.

For example, a program processor, such as a CPU, reads a software program stored in a recording medium, such as a hard disk or a semiconductor memory, and executes the software program, thereby realizing the elements. Examples of software that realizes some or all of the elements of the controller in the embodiments or the modifications described above are as follows. That is, a program according to one aspect is a control program for a standing motion assist system. The standing motion assist system includes a care belt including a holding mechanism including a holder that holds a back and both armpits of the care-receiver, and a connector that is located at a chest of the care-receiver and that is connected to the holding mechanism at a position in front of the care-receiver; a rotational force applying mechanism that is connected to the holding mechanism and that rotates a front lower part of the holder upward and a rear upper part of the holder downward about a rotation axis extending through both armpits of the care-receiver; a traction mechanism that is connected to the connector and that pulls the connector; and a controller that controls a rotational motion of the rotational force applying mechanism and a pulling motion of the traction mechanism. The program causes the controller to perform a process including: causing the controller to control the traction mechanism so that, after the traction mechanism has started the pulling motion, the traction mechanism pulls the connector forward and upward from the care-receiver; causing the controller to control the rotational force applying mechanism so that the rotational force applying mechanism rotates the holder at the same time as the traction mechanism pulls the connector forward and upward from the care-receiver; and subsequently, causing the controller to control the rotational force applying mechanism so that the rotational force applying mechanism rotates the holder while the traction mechanism pulls the connector upward.

A program according to another aspect is a control program for a standing motion assist system. The standing motion assist system includes a care belt including a holding mechanism including a holder that holds a back and both armpits of the care-receiver, and a connector that is located at a chest of the care-receiver and that is connected to the holding mechanism at a position in front of the care-receiver; a rotational force applying mechanism that is connected to the holding mechanism and that includes a first inflatable chamber and a second inflatable chamber that are located at the back of the care-receiver, the first inflatable chamber being located below the second inflatable chamber in a vertical direction, the first inflatable chamber and the second inflatable chamber independently inflating when a gas is independently supplied thereto; a traction mechanism that is connected to the connector and that pulls the connector; and a controller that controls a gas supplying operation of the rotational force applying mechanism and a pulling motion of the traction mechanism. The program causes the controller to perform a process including: causing the controller to control the traction mechanism so that the traction mechanism pulls the connector forward and upward from the care-receiver; causing the controller to control the rotational force applying mechanism so that the rotational force applying mechanism supplies the gas to the first inflatable chamber while the traction mechanism is pulling the connector forward and upward from the care-receiver; causing the controller to control the rotational force applying mechanism so that the rotational force applying mechanism supplies the gas to the second inflatable chamber after having supplied the gas to the first inflatable chamber; and subsequently, causing the controller to control the traction mechanism so that the traction mechanism pulls the connector upward.

A program according to still another aspect is a program for a standing motion assist system for assisting a care-receiver in performing a standing motion. The standing motion assist system includes a care belt including a holding mechanism that is attachable to a care-receiver and that includes a holder that is capable of holding a part of the care-receiver from a back to both armpits of the care-receiver, and a connector that can be positioned near a chest of the care-receiver and that is connected to the holding mechanism; a rotational force applying mechanism that is connected to the holding mechanism and that applies a rotational force to the care-receiver via the holding mechanism so that the back of the care-receiver, who is in a sitting position, leans backward; and a traction mechanism that is connected to the holding mechanism via the connector and that pulls the care belt forward and upward from the care-receiver so that the buttocks of the care-receiver, who is in the sitting position, leave a seat. The program causes a computer to perform a process including: controlling, in a first state before the buttocks of the care-receiver in the sitting position leave the seat, the rotational force applying mechanism so that the rotational force applying mechanism applies a rotational force with which the holding mechanism rotates about a rotation axis extending through both armpits of the care-receiver so that the back of the care-receiver in the sitting position leans backward; and controlling, when the rotational force applying mechanism is controlled as described above, the traction mechanism so that the traction mechanism pulls the care belt so as to pull the care-receiver forward and upward.

This program may be downloaded from a server or the like and executed or may be read from a predetermined record medium (for example, an optical disk such as a CD-ROM, a magnetic disk, or a semiconductor memory) and executed.

The program may be executed by a single computer or a plurality of computers. That is, integrated processing may be performed or distributed processing may be performed.

Moreover, any of the embodiments and modifications described above may be used in combination to obtain advantages of the embodiments and modifications.

Combinations of the embodiments, combinations of examples, or combinations of the embodiments and the examples may be used. Combinations of features of different embodiments or examples may be used.

A care belt according to the present disclosure may be used for a purpose other than assisting of a care-receiver whose muscular strength has declined. For example, the care belt may be attached to, instead of a care-receiver having only a weak muscular strength, an able-bodied adult person, who holds a heavy load, as a supporter for assisting a standing motion.

The structure of a robot and control of the arm mechanism may be as follows.

For example, as illustrated in FIG. 4B, the robot 20A shown in FIG. 1A includes the arm mechanism 4 connected to the connector 3c included in a supporter and moves the connector 3c in the x-axis direction and/or in the z-axis direction. The supporter is the care belt 3, which includes the holder 3a for holding a user who is the care-receiver 7. For example, as illustrated in FIG. 9, the x-axis and the z-axis are parallel to an imaginary plane in which an arm included in the arm mechanism 4 moves, the x-axis and the z-axis are perpendicular to each other, and the z-axis is perpendicular to a surface (such as the floor 13) on which the robot is placed. The direction from the surface (such as the floor 13), on which the robot is placed, toward the robot is the positive z-axis direction. The direction from the connector 3c toward a user, to whom the supporter is attached, is the positive x-axis direction.

As illustrated in FIG. 4B, the rotational force applying mechanism 30 rotates the holder support member, to which the holder 3a is fixed, about the first rotation shaft 19a. When the user, to whom the supporter is attached, is seen from the left side of the user, the rotation of the first rotation shaft 19a in the clockwise direction is a rotation in the positive direction.

The motion information database 8 may contain data shown in FIG. 5B. The data shown in FIG. 5B includes target coordinates pi(Xi, Zi) of a position where a predetermined part (for example, the center) of an end portion of the arm mechanism 4 (point of contact with the connector 3c) is to be located at time ti; and a target rotation angle θi that the holder support member, to which the holder 3a is fixed, is to have at time ti.

The robot 20A includes the control device 11, which controls the arm mechanism 4 on the basis of data including a time contained in the motion information database 8 ("TIME" in FIG. 5B) and the target coordinates at the time ("POSITION" in FIG. 5B). For example, the control device 11 controls the first motor 41 and the second motor 42 included in the arm mechanism 4 to move the first arm 4c, the second arm 4d, and the third arm 4e so as to assist the user in performing a standing motion.

The robot 20A includes the control device 11, which controls the rotational force applying mechanism 30 on the basis of data including a time contained in the motion information database 8 ("TIME" in FIG. 5B) and the target rotation angle at the time ("ANGLE" in FIG. 5B). For example, the control device 11 controls the backward-leaning motor 45 included in the rotational force applying mechanism 30 to rotate the holder 3a in the clockwise direction in the side view of FIG. 3A via the holder support member 3b, thereby assisting the upper body of the user in leaning backward.

As illustrated in FIGS. 5B and 6B, when the time is in the period from t0 to t51, the z-coordinate of the target coordinates and the target angle increase with time. When the time is in the period from t0 to t30, the x-coordinate of the target coordinates decreases with time. When time is in the period from t30 to t51, the x-coordinate of the target coordinates increases with time. Here, t0<t1<t28<t29<t30<t31<t32<t50<t51.

As the control device 11 controls the robot on the basis of the data shown in FIG. 5B, the connector 3c moves forward and upward from a user in the period from t0 to t30. Subsequently, that is, in the period from t30 to t51, the connector 3c moves backward and upward from the user. That is, the robot 20A assists the user, to whom the supporter including the connector 3c is attached, in moving forward and upward in the period from t0 to t30. Subsequently, that is, in the period from t30 to t51, the robot 20A assists the user, to whom the supporter including the connector 3c is attached, in moving backward and upward.

As the control device 11 controls the robot on the basis of the data shown in FIG. 5B, the rotational force applying mechanism 30 rotates the supporter about the first rotation shaft 19a in a positive direction in the period from t0 to t51. That is, the robot 20A assists the user, to whom the supporter is attached, in performing a backward leaning motion with which back of the user leans backward.

The robot may start a standing-motion assisting operation at time t0 and may finish the operation at time t51. A standing-motion assist operation may include assisting a user in moving forward and upward in the period from t0 to t30, moving backward and upward in the period from t30 to t51, and leaning backward so that the back of the user lean backward in the period from t0 to t51.

When the robot is in the initial state (in which the robot has just started a standing-motion assisting operation), the first arm 4c and the third arm 4e may be perpendicular to a surface (for example, the floor 13) on which the robot is placed, the holder support member 3b and the arm support portion 3e may be perpendicular to the third arm 4e (perpendicular to the surface (for example, the floor 13) on which the robot is placed), the angle between the arm support portion 3e and the holder support member 3b may be zero, and a user may be in a sitting position.

Figure 4E:
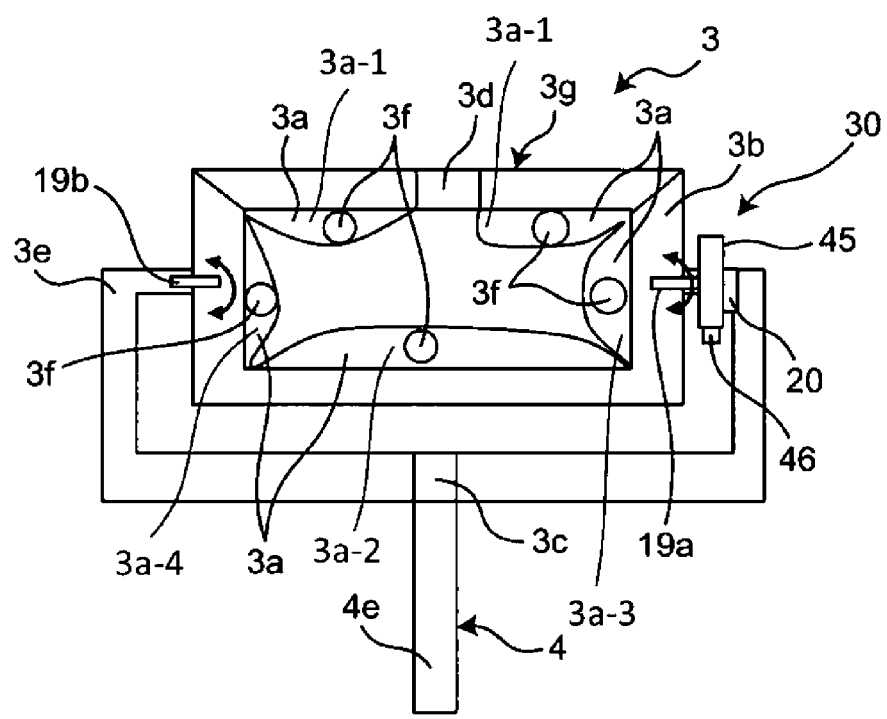
FIG. 4E is a plan view illustrating a holding mechanism according to a modification of the first embodiment of the present disclosure when an attachment portion of the holding mechanism is closed.

The supporter, which is the care belt 3, may be as follows. As illustrated in FIG. 4E, the care belt 3 (supporter) includes a back holder 3a-1 for supporting the back of a user, to whom the supporter is attached, a chest holder 3a-2 for supporting the chest of the user, to whom the supporter is attached, a left-chest-side holder 3a-3 for supporting the left side of the chest of the user, to whom the supporter is attached, a right-chest-side holder 3a-4 for supporting the right side of the chest of the user, to whom the supporter is attached, and an arm support portion that is connected to the connector 3c and is connected to the holder support member 3b via the rotational force applying mechanism, the holder support member 3b supporting the back holder 3a-1, the chest holder 3a-2, the left-chest-side holder 3a-3, and the right-chest-side holder 3a-4.

A standing motion assist system, a method for controlling a standing motion assist system, a recording medium, and a robot according to the present disclosure can be used to assist a care-receiver in standing up or walking.

What is claimed is:

1. A standing motion assist system for assisting a care-receiver in performing a standing motion, comprising:
  a care belt including
    a holding mechanism including a holder support member and a holder that holds a back and both armpits of the care-receiver, the holder support member including a front support member and a rear support member, the rear support member including an openable and closeable attachment portion configured to facilitate positioning of the care-receiver within the care belt so that the care-receiver may enter the care belt when the rear support member is in an open position and so that a circumferential portion of the care-receiver is surrounded by the holder support member when the rear support member is in a closed position, and a connector that is connected to the holding mechanism at a position in front of the care-receiver when the care-receiver is positioned within the care belt;

a rotational force applying mechanism that is connected to the holding mechanism and that rotates a front part of the holder upward and a rear part of the holder downward about a rotation axis being provided between the front support member which the front part is attached to and the rear support member which the rear part is attached to, a length between the connector and the front support member being smaller than a length between the connector and the rear support member, wherein, when the care-receiver is positioned within the care belt, the front support member is situated in front of the care-receiver and the rear support member is situated behind the care-receiver;

a traction mechanism that is connected to the connector and that pulls the connector; and a controller that controls a rotational motion of the rotational force applying mechanism and a pulling motion of the traction mechanism so that, after the traction mechanism has started the pulling motion, the rotational force applying mechanism rotates the front part of the holder upward and the rear part of the holder downward at the same time as the traction mechanism pulls the connector forward and upward, thereby the care-receiver being pulled forward and upward, and subsequently the traction mechanism pulls the connector upward.

2. The standing motion assist system according to claim 1, wherein the controller controls the traction mechanism so that the traction mechanism increases a pulling velocity while the traction mechanism is pulling the connector forward and upward to pull the care-receiver forward and upward.

3. The standing motion assist system according to claim 1, wherein the traction mechanism includes an arm mechanism including a plurality of joints, and wherein the standing motion assist system further comprises a walking mechanism that includes a pair of front and rear wheels and on which the arm mechanism is disposed.

4. The standing motion assist system according to claim 2, wherein the traction mechanism includes an arm mechanism including a plurality of joints, wherein the standing motion assist system further comprises:

a force acquirer that acquires force information about an external force applied to the arm mechanism;

a position acquirer that acquires position information about a position of the arm mechanism; and a motion information generator that generates motion information about a motion of the arm mechanism from the force information acquired by the force acquirer and the position information acquired by the position acquirer, and wherein the controller controls the motion of the arm mechanism on the basis of the motion information generated by the motion information generator.

5. The standing motion assist system according to claim 4, wherein, when the controller is controlling the traction mechanism so that the traction mechanism pulls the connector forward and upward, the motion information generator calculates a difference between a first force at a first time and a second force at a second time, the first time being earlier than the second time, the first and second forces being acquired by the force acquirer, wherein, from a time when the traction mechanism starts pulling the connector to a time when a sign of the difference between the first force and the second force acquired by the force acquirer changes, the motion information generator generates motion information such that the arm mechanism pulls the connector forward and upward, and wherein, after the sign of the difference between the first force and the second force has changed, the motion information generator generates motion information such that the arm mechanism pulls the connector upward.

6. A method for controlling a standing motion assist system for assisting a care-receiver in performing a standing motion that includes a care belt including a holding mechanism including a holder support member and a holder that holds a back and both armpits of the care-receiver, the holder support member including a front support member and a rear support member, the rear support member including an openable and closeable attachment portion configured to facilitate positioning of the care-receiver within the care belt so that the care-receiver may enter the care belt when the rear support member is in an open position and so that a circumferential portion of the care-receiver is surrounded by the holder support member when the rear support member is in a closed position, and a connector that is connected to the holding mechanism at a position in front of the care-receiver when the care-receiver is positioned within the care belt, a rotational force applying mechanism that is connected to the holding mechanism and that rotates a front part of the holder upward and a rear part of the holder downward about a rotation axis being provided between the front support member which the front part is attached to and the rear support member which the rear part is attached to, a length between the connector and the front support member being smaller than a length between the connector and the rear support member, wherein, when the care-receiver is positioned within the care belt, the front support member is situated in front of the care-receiver and the rear support member is situated behind the care-receiver, a traction mechanism that is connected to the connector and that pulls the connector, and a controller that controls a rotational motion of the rotational force applying mechanism and a pulling motion of the traction mechanism, the method comprising:

causing the controller to control the traction mechanism so that, after the traction mechanism has started the pulling motion, the traction mechanism pulls the connector forward and upward from the care-receiver;

causing the controller to control the rotational force applying mechanism so that the rotational force applying mechanism rotates the holder at the same time as the traction mechanism pulls the connector forward and upward, thereby the care-receiver being pulled forward and upward; and subsequently, causing the controller to control the rotational force applying mechanism so that the rotational force applying mechanism rotates the holder while the traction mechanism pulls the connector upward.

7. A non-transitory computer-readable recording medium storing a control program for causing an apparatus including a processor to execute a process for assisting a care-receiver in performing a standing motion, the apparatus including a care belt including
- a holding mechanism including a holder support member and a holder that holds a back and both armpits of the care-receiver, the holder support member including a front support member and a rear support member, the rear support member including an openable and closeable attachment portion configured to facilitate positioning of the care-receiver within the care belt so that the care-receiver may enter the care belt when the rear support member is in an open position and so that a circumferential portion of the care-receiver is surrounded by the holder support member when the rear support member is in a closed position, and
- a connector that is connected to the holding mechanism at a position in front of the care-receiver when the care-receiver is positioned within the care belt, a rotational force applying mechanism that is connected to the holding mechanism and that rotates a front part of the holder upward and a rear part of the holder downward about a rotation axis being provided between the front support member which the front part is attached to and the rear support member which the rear part is attached to, a length between the connector and the front support member being smaller than a length between the connector and the rear support member, wherein, when the care-receiver is positioned within the care belt, the front support member is situated in front of the care-receiver and the rear support member is situated behind the care-receiver, a traction mechanism that is connected to the connector and that pulls the connector, and a controller that controls a rotational motion of the rotational force applying mechanism and a pulling motion of the traction mechanism, the process comprising:

causing the controller to control the traction mechanism so that, after the traction mechanism has started the pulling motion, the traction mechanism pulls the connector forward and upward from the care-receiver;

causing the controller to control the rotational force applying mechanism so that the rotational force applying mechanism rotates the holder at the same time as the traction mechanism pulls the connector forward and upward, thereby the care-receiver being pulled forward and upward; and subsequently, causing the controller to control the rotational force applying mechanism so that the rotational force applying mechanism rotates the holder while the traction mechanism pulls the connector upward.

* * * * *